(12) United States Patent
Togino et al.

(10) Patent No.: US 6,178,048 B1
(45) Date of Patent: Jan. 23, 2001

(54) IMAGE-FORMING OPTICAL SYSTEM

(75) Inventors: Takayoshi Togino, Koganei; Yuji Kamo, Hino, both of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/329,301

(22) Filed: Jun. 10, 1999

(30) Foreign Application Priority Data

Jun. 12, 1998 (JP) ................................................. 10-164834

(51) Int. Cl.$^7$ ................................................. G02B 27/14
(52) U.S. Cl. ........................... 359/637; 359/631; 359/633
(58) Field of Search ................................... 359/630, 631, 359/633, 636, 637

(56) References Cited

U.S. PATENT DOCUMENTS

| | | | |
|---|---|---|---|
| 5,699,194 | 12/1997 | Takahashi | 359/633 |
| 5,701,202 | 12/1997 | Takahashi | 359/631 |
| 5,745,295 | 4/1998 | Takahashi | 359/631 |
| 6,008,948 | * 12/1999 | Togino | 359/637 |

FOREIGN PATENT DOCUMENTS

| | | |
|---|---|---|
| 0 687 932 | 12/1995 | (EP) . |
| 0 788 003 | 8/1997 | (EP) . |
| 0 790 513 | 8/1997 | (EP) . |
| 0 802 436 | 10/1997 | (EP) . |
| 10-68884 | 3/1998 | (JP) . |

OTHER PUBLICATIONS

Patent Abstracts of Japan, No. 7–333505, "Image Pickup Device", Dec. 1995.
Patent Abstracts of Japan, No. 8–292371, "Reflection Type Optical System and Image Pickup Device Using the System", Nov. 1996.
Patent Abstracts of Japan, No. 8–292372, "Reflection Type Zoom Optical System and Image Pickup Device Using the System", May 1996.
Patent Abstracts of Japan No. 8–292368, "Reflection Type Zoom Optical System and Image Pickup Device Using the System", May 1996.
Patent Abstracts of Japan No. No. 9–090229, "Optical Element", Apr. 1997.
Patent Abstracts of Japan No. No. 9–222563, "Reflection Type Optical System and Image Pickup Device Using Same", Aug. 1997.
Patent Abstracts of Japan No. 9–0005650, "Processing Method and Processor Using the Same", Jan. 1997.
Patent Abstracts of Japan No. 10–153748, "Observation Optical System", Jun. 1998.

* cited by examiner

*Primary Examiner*—Loha Ben
(74) *Attorney, Agent, or Firm*—Pillsbury Madison & Sutro LLP

(57) ABSTRACT

A high-performance image-forming optical system made compact and thin with a minimal number of constituent optical elements and particularly suitable for use in a camera. A first prism is placed on the object side of a second prism. The first prism has a first transmitting surface, a first reflecting surface, a second reflecting surface, a third reflecting surface, and a second transmitting surface. The first transmitting surface and the third reflecting surface are the identical surface, and the first reflecting surface and the second transmitting surface are the identical surface. The second prism has an entrance surface, at least one reflecting surface, and an exit surface. The first prism and the second prism each have at least one reflecting surface with a rotationally asymmetric surface configuration that corrects decentration aberrations.

24 Claims, 14 Drawing Sheets

IMAGE-FORMING OPTICAL SYSTEM

BACKGROUND OF THE INVENTION

The present invention relates to image-forming optical systems. More particularly, the present invention relates to a compact and high-performance decentered optical system with reflecting surfaces having power for use in optical apparatus using a small-sized image pickup device, e.g. video cameras and digital still cameras.

Recently, with the achievement of small-sized image pickup devices, image-forming optical systems for use in video cameras and digital still cameras, etc. have also been required to be reduced in size and weight and also in cost.

In the general rotationally symmetric coaxial optical systems, however, optical elements are arranged in the direction of the optical axis. Therefore, there is a limit to the reduction in thickness of the optical systems. At the same time, the number of lens elements unavoidably increases because it is necessary to correct chromatic aberration produced by a rotationally symmetric refracting lens used in the optical systems. Therefore, it is difficult to reduce the cost in the present state of the art. Under these circumstances, there have recently been proposed optical systems designed to be compact in size by giving a power to a reflecting surface, which produces no chromatic aberration and folds an optical path in the optical axis direction.

Japanese Patent Application Unexamined Publication Number [hereinafter referred to as "JP(A)"] 7-333505 proposes to reduce the thickness of an optical system by giving a power to a decentered reflecting surface and thereby folding an optical path. In an example thereof, however, the number of constituent optical members is as large as five, and actual optical performance is unclear. No mention is made of the configuration of the reflecting surface.

JP(A) 8-292371, 9-5650 and 9-90229 each disclose an optical system in which an optical path is folded by a single prism or a plurality of mirrors integrated into a single block, and an image is relayed in the optical system to form a final image. In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably. The relay of the image also causes the overall volumetric capacity of the optical system to increase unfavorably.

JP(A) 9-222563 discloses an example of an optical system that uses a plurality of prisms. However, because the optical system is arranged to relay an image, the cost increases and the optical system becomes large in size unfavorably for the same reasons as stated above.

JP(A) 9-211331 discloses an example of an optical system in which an optical path is folded by using a single prism to achieve a reduction in size of the optical system. However, the optical system is not satisfactorily corrected for aberrations.

JP(A) 8-292368, 8-292372, 9-222561, 9-258105 and 9-258106 all disclose examples of zoom lens systems. In these examples, however, the number of reflections is undesirably large because an image is relayed in a prism. Therefore, surface accuracy errors and decentration accuracy errors of reflecting surfaces are transferred while being added up, unfavorably. At the same time, the overall size of the optical system unavoidably increases, unfavorably.

JP(A) 10-20196 discloses an example of a two-unit zoom lens system having a positive front unit and a negative rear unit, in which the positive front unit comprises a prism of negative power placed on the object side of a stop and a prism of positive power placed on the image side of the stop. JP(A) 10-20196 also discloses an example in which the positive front unit, which comprises a prism of negative power and a prism of positive power, is divided into two to form a three-unit zoom lens system having a negative unit, a positive unit and a negative unit. However, the prisms used in these examples each have two transmitting surfaces and two reflecting surfaces, which are all independent surfaces. Therefore, a relatively wide space must be ensured for the prisms. In addition, the image plane is large in size in conformity to the Leica size film format. Accordingly, the prisms themselves become unavoidably large in size. Furthermore, because the disclosed zoom lens systems are not telecentric on the image side, it is difficult to apply them to image pickup devices such as CCDs. In either of the examples of zoom lens systems, zooming is performed by moving the prisms. Accordingly, the decentration accuracy required for the reflecting surfaces becomes tight in order to maintain the required performance over the entire zooming range, resulting in an increase in the cost.

JP(A) 10-68884 discloses an example of an optical system that uses two prisms. In this optical system, however, an intermediate image is formed at a halfway position in an optical path. Accordingly, the power of each surface is strong, and thus aberration correction is unfavorably restricted. There is also a limit to the reduction in thickness of the optical system.

When a general refracting optical system is used to obtain a desired refracting power, chromatic aberration occurs at an interface surface thereof according to the chromatic dispersion characteristics of an optical element. To correct the chromatic aberration and also correct other ray aberrations, the refracting optical system needs a large number of constituent elements, causing the cost to increase. In addition, because the optical path extends straight along the optical axis, the entire optical system undesirably lengthens in the direction of the optical axis, resulting in an unfavorably large-sized image pickup apparatus.

An image-forming optical system that is relatively compact, thin and good in terms of aberration correcting performance can be realized by a decentered optical system using a prism having a decentered reflecting surface with a power as stated above in regard to the prior art. However, the image-forming optical system according to the prior art is still unsatisfactory in terms of the achievement of a favorably compact, thin and high-performance optical system.

SUMMARY OF THE INVENTION

In view of the above-described circumstances of the prior art, an object of the present invention is to provide a high-performance image-forming optical system which is made compact and thin with a minimal number of constituent optical elements and which is particularly suitable for use in a camera.

To attain the above-described object, the present invention provides an image-forming optical system for forming an image of an object. The image-forming optical system has a first prism and a second prism. The first prism is placed on the object side of the second prism. The first prism has, in the order in which rays from the object pass, a first transmitting surface, a first reflecting surface, a second reflecting surface, a third reflecting surface, and a second transmitting surface. The first transmitting surface and the third reflecting surface are the identical surface, and the first reflecting surface and the second transmitting surface are the identical surface.

The second prism has an entrance surface, at least one reflecting surface, and an exit surface.

The first prism and the second prism each have at least one reflecting surface with a rotationally asymmetric surface configuration that corrects decentration aberrations.

In this case, it is desirable to arrange the image-forming optical system such that an object image is formed on an image plane without forming an intermediate image in an optical path.

In addition, the present invention provides an image-forming optical system having at least two prisms arranged to form an image of an object on an image plane without forming an intermediate image in an optical path. The image-forming optical system satisfies the following condition:

$$0.3 < d/Ih < 10 \tag{1}$$

where, when a light ray emanating from the center of the object and passing through the center of a stop to reach the center of the image plane is defined as an axial principal ray, and the direction in which the axial principal ray enters the optical system is defined as a Z-axis direction, d is the maximum thickness in the Z-axis direction of an area that is defined by the effective surface areas of all optical surfaces constituting the optical system and those of the stop plane and the image plane, and Ih is the maximum image height in the optical system.

The reasons for adopting the above-described arrangements in the present invention, together with the functions thereof, will be described below in order.

The first image-forming optical system according to the present invention, which is provided to attain the above-described object, is an image-forming optical system for forming an image of an object. The image-forming optical system has a first prism and a second prism. The first prism is placed on the object side of the second prism. The first prism has, in the order in which rays from the object pass, a first transmitting surface, a first reflecting surface, a second reflecting surface, a third reflecting surface, and a second transmitting surface. The first transmitting surface and the third reflecting surface are the identical surface, and the first reflecting surface and the second transmitting surface are the identical surface. The second prism has an entrance surface, at least one reflecting surface, and an exit surface. The first and second prisms each have at least one reflecting surface with a rotationally asymmetric surface configuration that corrects decentration aberrations.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, an image-forming optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

Accordingly, the present invention adopts an arrangement in which two prisms are provided to obtain a satisfactory symmetry with respect to the stop, thereby enabling not only axial aberrations but also off-axis aberrations to be favorably corrected. In the case of an arrangement using only one prism, asymmetry with respect to the stop is enhanced, and off-axis aberrations are unavoidably aggravated.

Furthermore, in the present invention, the first prism, which is placed on the object side of the second prism, has a first transmitting surface, a first reflecting surface, a second reflecting surface, a third reflecting surface, and a second transmitting surface. The first transmitting surface and the third reflecting surface are formed from the identical surface, and the first reflecting surface and the second transmitting surface are formed from the identical surface, thereby achieving a compact, thin and high-performance optical system.

FIG. 1 is a ray path diagram showing a typical arrangement of the first image-forming optical system according to the present invention. When a light ray emanating from the center of an object and passing through the center of a stop 2 to reach the center of an image plane 3 is defined as an axial principal ray 1, the illustrated image-forming optical system includes a first prism 10 and a second prism 20. The first prism 10 is placed on the object side of the second prism 20. The first prism 10 has, in the order in which rays from the object pass, a first transmitting surface 11, a first reflecting surface 12, a second reflecting surface 13, a third reflecting surface 14, and a second transmitting surface 15. The first transmitting surface 11 and the third reflecting surface 14 are the identical surface, and the first reflecting surface 12 and the second transmitting surface 15 are the identical surface. The second prism 20 has an entrance surface 21, at least one reflecting surface 22 (23) and an exit surface 24. The first prism 10 and the second prism 20 each have at least one reflecting surface with a rotationally asymmetric surface configuration that corrects decentration aberrations. The image-forming optical system forms an object image on the image plane 3 without forming an intermediate image.

As shown in FIG. 1, the first prism 10 is arranged such that light enters the first prism 10 while being refracted through the first transmitting surface 11, and the incident light is reflected by the first reflecting surface 12. The reflected light is reflected by the second reflecting surface 13, and the reflected light is further reflected by the third reflecting surface 14. The reflected light exits from the first prism 10 while being refracted through the second transmitting surface 15. Therefore, it is possible to increase the optical path length from a point at which the light enters the first prism 10 to a point at which the light exits from the first prism 10. Accordingly, when the image-forming optical system is arranged in the form of a retrofocus type in which the first prism 10 has a negative power (diverging action) and the second prism 20 has a positive power (converging action) in order to achieve a wide-angle and compact optical system, the first reflecting surface 12, which is assigned the principal negative power in the first prism 10, can be placed even more away from the stop 2, and at the same time, the power of the first reflecting surface 12 can be weakened. Thus, it is possible to reduce the size of the optical system and to correct aberrations even more favorably.

When an optical axis is defined by the axial principal ray 1 emanating from the object center and passing through the stop center to reach the center of the image plane 3, it is desirable for the first prism 10 to have a configuration in which the angle formed between the optical axis incident on the first transmitting surface 11 and the optical axis reflected by the third reflecting surface 14 is larger than the angle formed between the optical axis incident on the first transmitting surface 11 and the optical axis reflected by the second reflecting surface 13, and the second-mentioned angle is larger than the angle formed between the optical axis incident on the first transmitting surface 11 and the optical axis reflected by the first reflecting surface 12. With this arrangement, the rays entering the first prism 10 through the first surface 11 travel round behind the first surface 11. Accordingly, despite the fact that the optical path length in the first prism 10 can be increased as stated above, the thickness in the depth direction of the first prism 10 can be reduced. In addition, because the optical axis exiting from the first prism 10 can be directed so as to form an angle to the optical axis entering the first prism 10, it is possible to reduce the thickness in the depth direction of the optical system.

Furthermore, it is desirable to place the stop 2 between the first prism 10 and the second prism 20 and to arrange the image-forming optical system so that it is approximately telecentric on the image side. By virtue of this arrangement, the two prisms are placed in symmetry with respect to the stop, and it becomes possible to favorably correct not only axial aberrations but also off-axis aberrations.

Next, the arrangement of an image-forming optical system that is approximately telecentric on the image side will be described in detail.

As has been stated above, reflecting surfaces have a high decentration error sensitivity in comparison to refracting surfaces. Therefore, it is desirable to provide an arrangement of an optical system that is as independent of the high decentration error sensitivity as possible. In the case of a general coaxial optical system arranged to be approximately telecentric on the image side, because extra-axial principal rays are approximately parallel to the optical axis, the positional accuracy of the extra-axial rays is satisfactorily maintained on the image plane even if defocusing is effected. Therefore, the image-forming optical system according to the present invention is arranged to reflect the property of the above-described arrangement. In particular, to prevent the performance of the optical system using reflecting surfaces, which have a relatively high decentration error sensitivity, from being deteriorated by focusing, the image-forming optical system according to the present invention adopts an arrangement in which it is approximately telecentric on the image side, whereby the positional accuracy of extra-axial rays is maintained favorably.

Such an arrangement enables the present invention to be suitably applied to an image pickup optical system using an image pickup device, e.g. a CCD, in particular. Adopting the above-described arrangement minimizes the influence of the cosine fourth law. Accordingly, it is also possible to reduce shading.

It should be noted that the first transmitting surface 11 and the third reflecting surface 14 are the identical surface, and the first reflecting surface 12 and the second transmitting surface 15 are the identical surface. It is desirable that the first reflecting surface 12 and the third reflecting surface 14 should be formed as totally reflecting surfaces. If these surfaces do not satisfy the condition for total reflection, they cannot have both reflecting and transmitting actions, and it becomes difficult to reduce the size of the prism.

The reflecting surfaces, exclusive of the totally reflecting surfaces, are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

Thus, it is possible to obtain a low-cost and compact image-forming optical system in which the prism manufacturing accuracy is favorably eased.

It should be noted that the second prism 20 may be arranged as shown in FIG. 1. That is, the second prism 20 has, in the order in which rays from the object pass, a first transmitting surface 21, a first reflecting surface 22, a second reflecting surface 23, and a second transmitting surface 24. The first reflecting surface 22 and the second transmitting surface 24 are the identical surface. By using the second prism 20 with such a configuration, the optical axis exiting from the first prism 10 at an angle to the optical axis entering the first prism 10 can be directed to a direction parallel to the optical axis entering the first prism 10. Accordingly, even in the image-forming optical system according to the present invention, in which the optical path is folded complicatedly, the image plane 3 can be placed approximately perpendicular to the optical axis entering the first prism 10. Therefore, the image plane can be disposed in an apparatus with the same feeling as in the case of the conventional concentric (coaxial) optical system. Thus, the image-forming optical system according to the present invention is easier to assemble, and is compact for use in a camera or the like.

It is undesirable to increase the number of reflections more than is needed because decentration errors at each reflecting surface would be added up to a correspondingly large extent. It is preferable for the image-forming optical system to have only one image-formation plane without forming an intermediate image throughout the system. In the case of an image-forming optical system in which an intermediate image is formed and this image is relayed, the number of reflections increases more than is needed, and the manufacturing accuracy required for each surface becomes tight, causing the cost to increase unfavorably.

In the present invention, it is desirable for the image-forming optical system to have a prism having a diverging action on the object side of the stop and a prism having a converging action on the image side of the stop, and also desirable for the image-forming optical system to be approximately telecentric on the image side.

In an image-forming optical system using a refracting optical element, the power distribution varies according to the use application. For example, telephoto systems having a narrow field angle generally adopt an arrangement in which the entire system is formed as a telephoto type having a positive front unit and a negative rear unit, thereby making the overall length of the optical system shorter than the focal length. Wide-angle systems having a wide field angle generally adopt an arrangement in which the entire system is formed as a retrofocus type having a negative front unit and a positive rear unit, thereby making the back focus longer than the focal length.

In the case of an image-forming optical system using an image pickup device, e.g. a CCD, in particular, it is necessary to place an optical low-pass filter or an infrared cutoff filter between the image-forming optical system and the image pickup device to remove moire or to eliminate the influence of infrared rays. Therefore, with a view to ensuring a space for placing these optical members, it is desirable to adopt a retrofocus type arrangement for the image-forming optical system.

It is important for a retrofocus type image-forming optical system to be corrected for aberrations, particularly off-axis aberrations. The correction of off-axis aberrations depends largely on the position of the stop. As has been stated above, in the case of a general coaxial optical system, off-axis aberrations are aggravated if optical elements are not in symmetry with respect to the stop. For this reason, the common practice is to place optical elements of the same sign at respective positions facing each other across the stop, thereby obtaining a satisfactory symmetry with respect to the stop, and thus correcting off-axis aberrations. In the case of a retrofocus type system having a negative front unit and a positive rear unit, the power distribution is asymmetric in the first place. Therefore, the off-axis aberration-correcting performance varies to a considerable extent according to the position of the stop.

Therefore, the stop is placed between the object-side prism having a diverging action and the image-side prism having a converging action, thereby making it possible to minimize the aggravation of off-axis aberrations due to the asymmetry of the power distribution. If the stop is placed on the object side of the object-side diverging prism or on the image side of the image-side converging prism, the asymmetry with respect to the stop is enhanced and becomes difficult to correct.

It is also desirable from the viewpoint of aberration correction that at least one of the surfaces constituting each of the first and second prisms used in the present invention should be a reflecting surface with a rotationally asymmetric surface configuration that corrects decentration aberrations.

The reason for this will be described below in detail.

First, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the image-forming optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma, and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 17, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 18, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 19, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of the free-form surface.

$$Z = cr^2 / \left[1 + \sqrt{\{1 - (1+k)c^2 r^2\}}\right] + \sum_{j=2}^{66} C_j X^m Y^n \quad (a)$$

In Eq. (a), the first term is a spherical surface term, and the second term is a free-form surface term.

In the spherical surface term:
c: the curvature at the vertex
k: a conic constant
r = √(X² + Y²)

The free-form surface term is given by $$\sum_{j=2}^{66} C_j X^m Y^n = C_2 X + C_3 Y + C_4 X^2 + C_5 XY + C_6 Y^2$$
$$+ C_7 X^3 + C_8 X^2 Y + C_9 XY^2 + C_{10} Y^3$$
$$+ C_{11} X^4 + C_{12} X^3 Y + C_{13} X^2 Y^2 + C_{14} XY^3 + C_{15} Y^4$$
$$+ C_{16} X^5 + C_{17} X^4 Y + C_{18} X^3 Y^2 + C_{19} X^2 Y^3 + C_{20} XY^4$$
$$+ C_{21} Y^5 + C_{22} X^6 + C_{23} X^5 Y + C_{24} X^4 Y^2 + C_{25} X^3 Y^3$$
$$+ C_{26} X^2 Y^4 + C_{27} XY^5 + C_{28} Y^6 + C_{29} X^7 + C_{30} X^6 Y$$
$$+ C_{31} X^5 Y^2 + C_{32} X^4 Y^3 + C_{33} X^3 Y^4 + C_{34} X^2 Y^5 + C_{35} XY^6$$
$$+ C_{36} Y^7$$

where $C_j$ (j is an integer of 2 or higher) are coefficients.

In general, the above-described free-form surface does not have planes of symmetry in both the XZ- and YZ-planes.

In the present invention, however, a free-form surface having only one plane of symmetry parallel to the YZ-plane is obtained by making all terms with odd-numbered powers of X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, the productivity can be improved.

It should be noted that the above defining equation (a) is shown as merely an example, and that the feature of the present invention resides in that rotationally asymmetric aberrations due to decentration are corrected and, at the same time, the productivity is improved by using a rotationally asymmetric surface having only one plane of symmetry. Therefore, the same advantageous effect can be obtained for any other defining equation that expresses such a rotationally asymmetric surface.

It should be noted that the first image-forming optical system according to the present invention may be modified as follows. The first prism 10 in FIG. 1 is placed at the position of the second prism 20, and the second prism 20 in FIG. 1 is placed as a first prism. The two prisms each have at least one reflecting surface with a rotationally asymmetric surface configuration that corrects decentration aberrations. In this case also, the image-forming optical system is arranged to form an object image on the image plane without forming an intermediate image.

Next, the second image-forming optical system according to the present invention is an image-forming optical system having at least two prisms arranged to form an image of an object on an image plane without forming an intermediate image in an optical path, inclusive of an image-forming optical system such as that shown in FIG. 1. The image-forming optical system satisfies the following condition:

$$0.3 < d/Ih < 10 \quad (1)$$

where, when a light ray emanating from the center of the object and passing through the center of a stop to reach the center of the image plane is defined as an axial principal ray, and the direction in which the axial principal ray enters the optical system is defined as a Z-axis direction, d is the maximum thickness in the Z-axis direction of an area that is defined by the effective surface areas of all optical surfaces constituting the optical system and those of the stop plane and the image plane, and Ih is the maximum image height in the optical system.

When a Z-axis is taken in the direction in which the axial principal ray 1 enters the first prism 10 of the image-forming optical system having two prisms 10 and 20 arranged to form an object image on the image plane 3 without forming an intermediate image in the optical path as illustrated in FIG. 1, the condition (1) defines the thickness in the Z-axis direction. If d/Ih is not smaller than the upper limit of the condition, i.e. 10, it becomes impossible to reduce the thickness in the Z-axis direction when the image-forming optical system is incorporated into a camera or the like, and hence impossible to attain a reduction in the thickness, which is the object of the present invention. If d/Ih is not larger than the lower limit, i.e. 0.3, the size of each prism constituting the image-forming optical system becomes excessively small, so that it is impossible to obtain a sufficient optical path length in each prism. Accordingly, in order to obtain the desired power, the curvature of each reflecting surface becomes excessively large, and it becomes impossible to correct decentration aberrations satisfactorily.

It is more desirable to satisfy the following condition:

$$0.3<d/Ih<5 \qquad (2)$$

In the second image-forming optical system according to the present invention, it is preferable that the two prisms should be placed with a spacing therebetween. It is known that, among aberrations in an optical system, comatic and astigmatic aberrations relate to the marginal principal ray height, and, therefore, the position of an aperture stop is important. Accordingly, it is desirable from the viewpoint of performance to place an aperture stop near the middle of the optical path so that the optical system is symmetric with respect to the stop. However, in the case of a prism optical system, it is difficult to place another member in the optical path because internal reflection takes place in the prism. In a case where an optical system is formed from a plurality of prisms as in the present invention, it is desirable to provide a spacing between the prisms so that another member, e.g. an aperture stop, can be placed in the optical system. If the image-forming optical system is arranged as stated above, an aperture stop can be placed in the spacing between the prisms. Accordingly, the optical system improves in symmetry, and in particular, comatic and astigmatic aberrations are improved.

It is well known that in the case of using a solid-state image pickup device having regularly arrayed pixels, if a subject contains a frequency component higher than the sampling frequency, the solid-state image pickup device may generate moire fringes. Therefore, the conventional practice is to use an optical low-pass filter to minimize moire fringes. In many cases, the optical low-pass filter is placed immediately in front of the solid-state image pickup device. However, this arrangement is unsuitable for reducing the thickness of the optical system when the entrance and exit axes of the optical system are parallel to each other. In the case of a prism optical system, if the optical axis direction is changed to a considerable extent by reflection, the thickness of the optical system can be reduced by placing a low-pass filter at a position where the optical system will not increase in size in the thickness direction, for example, at an intermediate position of the optical path. However, in the case of a prism optical system, it is difficult to place another member in the optical path, as stated above. Therefore, in a case where an optical system is formed from a plurality of prisms as in the present invention, it is preferable to arrange the prisms with a spacing therebetween. By doing so, a low-pass filter can be placed in the spacing. Therefore, the thickness of the optical system can be reduced. It is preferable from the viewpoint of performance that the optical low-pass filter should be a phase type low-pass filter, e.g. a diffraction grating.

In the above-described case, it is desirable that the spacing $d_1$ between the two prisms should satisfy the following condition:

$$0.1<d_1/Ih<20 \qquad (3)$$

where $d_1$ is the length of the axial principal ray between the two prisms.

If $d_1/Ih$ is not larger than the lower limit of the condition, i.e. 0.1, it becomes impossible to place an aperture stop, a low-pass filter, etc. If $d_1/Ih$ is not smaller than the upper limit, i.e. 20, the optical system becomes undesirably large in size.

It is more desirable to satisfy the following condition:

$$0.3<d_1/Ih<10 \qquad (4)$$

In the second image-forming optical system according to the present invention, it is also desirable that at least one prism should satisfy the following condition:

$$30°<\theta_1<150° \qquad (5)$$

where $\theta_1$ is the angle formed between the axial principal ray entering the prism (entrance axis) and the axial principal ray exiting from the prism (exit axis).

In a case where an optical system is arranged such that the entrance axis and the exit axis are parallel to each other as in a conventional non-decentered optical system, the thickness of a camera incorporating the optical system cannot satisfactorily be reduced even if the number of constituent lens elements is reduced. That is, there is a limit to the reduction in thickness of the camera. If the direction of the optical axis is changed by using reflection, the thickness can be reduced. However, in a case where a plurality of prisms are used as in the present invention, if the entrance and exit axes of each prism are parallel or nearly parallel to each other, when the prisms are connected together to form an optical system, the optical system becomes unfavorably large in size in the thickness direction. Therefore, it is desirable to arrange at least one prism so that the angle $\theta_1$ formed between the entrance and exit axes of the prism satisfies the condition (5).

If $\theta_1$ is not smaller than the upper limit of the condition, i.e. 150°, or not larger than the lower limit, i.e. 30°, the thickness of the camera becomes undesirably large even if the prism optical system is used.

It is more desirable to satisfy the following condition:

$$45°<\theta_1<135° \qquad (6)$$

It is even more desirable to satisfy the following condition:

$$45°<\theta_1<90° \qquad (7)$$

In the second image-forming optical system according to the present invention, it is also desirable that at least one reflecting surface should satisfy the following condition:

$$25°<\theta_2<80° \qquad (8)$$

where $\theta_2$ is the reflection angle of the axial principal ray at the reflecting surface with respect to a line normal to the reflecting surface.

As has heretofore been known, if the overall length of the optical system is reduced excessively, the power and curvature of each individual lens become strong, and the performance degrades. Therefore, the overall length must be long to a certain extent with respect to the focal length. The same is the case with the arrangement in which the optical path is folded by using reflecting surfaces. In other words, it is necessary to ensure a folded optical path length corresponding to the overall length. That is, satisfactory performance cannot be obtained unless a certain optical path length is ensured. When the thickness of the optical system is defined as the size in a direction parallel to the optical axis entering the optical system, if the optical system is arranged such that reflected rays return approximately parallel to the entrance optical axis, a satisfactorily long optical path length cannot be obtained if it is intended to reduce the thickness. It is necessary in order to increase the optical path length to place many reflecting surfaces. In the case of reflecting surfaces, performance is degraded by decentration errors and surface accuracy errors to a larger extent than in the case of refracting surfaces Therefore, if too many reflecting surfaces are placed, the optical system arrangement becomes unfavorable from the viewpoint of manufacturing accuracy. Therefore, in order to increase the optical path length with a minimal number of reflecting surfaces, it is necessary to arrange the optical system so that the optical axis forms a large angle to the entrance optical axis. For this reason, it is preferable that the reflection angle $\theta_2$ at at least one surface should satisfy the above-described condition.

If $\theta_2$ is not smaller than the upper limit of the condition, i.e. 80°, the effective surface area of the prism reflecting surface becomes undesirably large, resulting in an unfavorably large-sized prism. If $\theta_2$ is not larger than the lower limit, i.e. 25°, a large number of reflecting surfaces must be used in order to attain high performance.

It is more desirable to satisfy the following condition:

$$30° < \theta_2 < 60° \tag{9}$$

It is also preferable that each of two reflecting surfaces that lie in front of and behind the stop should satisfy the condition (8). When rays are bent at a large angle, decentration aberrations are likely to occur. Decentration aberrations can be canceled advantageously by placing such reflecting surfaces approximately in symmetry with respect to the stop.

In the second image-forming optical system according to the present invention, it is desirable that all the refracting surfaces should satisfy the following condition:

$$|Ih/R| < 0.5 \tag{10}$$

where R is the radius of curvature of each refracting surface in the vicinity of the axial principal ray. In a case where a refracting surface has a free-form surface configuration expressed by $Z = \Sigma C_j X^m Y^n$, R is $R = 1/(2C_4)$ or $R = 1/(2C_6)$ defined by the coefficient $C_4$ of $X^2$ or the coefficient $C_6$ of $Y^2$.

When an optical system contains a refracting surface, chromatic aberration is produced when rays are refracted by the refracting surface. This gives rise to a problem in optical design. In contrast, reflecting surfaces do not produce any chromatic aberration even if they have a power. Therefore, it is preferable to use a reflecting prism in an optical system from the viewpoint of performance in regard to chromatic aberration. However, even when an optical system is formed by using reflecting prisms as in the present invention, each prism has at least two refracting surfaces, i.e. an entrance surface and an exit surface, in addition to reflecting surfaces. Therefore, the occurrence of chromatic aberration cannot be avoided. For this reason, it is preferable from the viewpoint of chromatic aberration correction to assign the greater part of the desired power to the reflecting surfaces to thereby minimize the power of each refracting surface. Accordingly, it is desirable that the curvature radius R of each refracting surface should satisfy the above-described condition.

If $|Ih/R|$ is not smaller than the upper limit of the condition, i.e. 0.5, the amount of chromatic aberration produced by the refracting surface becomes excessively large, causing the performance to degrade unfavorably.

It is more desirable to satisfy the following condition:

$$|Ih/R| < 0.3 \tag{11}$$

In the second image-forming optical system according to the present invention, it is desirable that at least one refracting surface should satisfy the following condition:

$$3° < \phi < 60° \tag{12}$$

where $\phi$ is the tilt of the refracting surface with respect to the axial principal ray.

A decentered optical system unavoidably produces decentration aberrations, which are not produced in coaxial optical systems. Because the decentration aberrations are produced by decentered surfaces having power, the decentration aberrations cannot be corrected unless decentered surfaces are properly combined together. Therefore, it is conceivable to combine decentered reflecting surfaces. However, reflecting surfaces are highly sensitive to surface configuration errors and decentration errors, and the performance thereof is degraded to a considerable extent by these errors. Therefore, if too many reflecting surfaces are provided, problems arise in terms of manufacture and performance. On the other hand, even decentered refracting surfaces can correct the decentration aberrations. With respect to manufacturing errors, the degree of performance degradation of refracting surfaces is favorably lower than in the case of reflecting surfaces. A prism has refracting surfaces as the entrance and exit surfaces thereof. If the refracting surfaces are adapted to correct decentration aberrations, a high-performance optical system can be constructed without increasing the number of decentered reflecting surfaces used for the optical system. Accordingly, it is desirable to decenter at least one refracting surface so that the tilt $\phi$ of the refracting surface with respect to the axial principal ray satisfies the above-described condition.

If the tilt $\phi$ is not smaller than the upper limit of the condition, i.e. 60°, the amount of decentration aberrations produced by the refracting surface becomes excessively large, and the performance degrades undesirably If the tilt $\phi$ is not larger than the lower limit, i.e. 3°, the amount of decentration aberrations corrected by the refracting surface becomes excessively small. Consequently, the decentration aberrations in the optical system remain uncorrected.

It is more desirable to satisfy the following condition:

$$5° < \phi < 45° \tag{13}$$

It should be noted that it is desirable to satisfy at least one of the conditions (1) to (13) solely, and it is more desirable to satisfy a combination of any two or more of them at the same time.

In the image-forming optical system according to the present invention, the entrance axis and the exit axis do not always need to be parallel to each other but may be set at an appropriate angle to each other according to the layout of electric members, lens frame members, etc. in a camera, for example. However, it is most desirable from the viewpoint of assembly accuracy control that the entrance axis and the exit axis should be parallel or perpendicular to each other.

In the image-forming optical system according to the present invention, focusing can be effected by moving all the constituent elements or moving only one prism. However, it is also possible to effect focusing by moving the image-formation plane in the direction of the axial principal ray exiting from the surface closest to the image side. By doing so, it is possible to prevent displacement of the axial principal ray on the entrance side due to focusing even if the direction in which the axial principal ray from the object enters the optical system is not coincident with the direction of the axial principal ray exiting from the surface closest to the image side owing to the decentration of the image-forming optical system. It is also possible to effect focusing by moving a plurality of wedge-shaped prisms, which are formed by dividing a plane-parallel plate, in a direction perpendicular to the Z-axis. In this case also, focusing can be performed independently of the decentration of the image-forming optical system.

In the image-forming optical system according to the present invention, if at least one of the prisms is formed by using an organic material such as a plastic material, the cost can be reduced. It is desirable to use a material of low moisture absorption, such as amorphous polyolefin, because such a material has a minimum change in image-forming performance with changes in moisture.

In the image-forming optical system according to the present invention, temperature compensation can be made by using a diverging prism and a converging prism. By providing the prisms with powers of different signs, it is possible to prevent the focal shift due to changes in temperature, which is a problem arising when a plastic material is used to form a prism.

In the present invention, the optical path can be folded in a direction different from the decentration direction of the image-forming optical system according to the present invention by placing a reflecting optical member, e.g. a mirror, on the object side of the entrance surface of the image-forming optical system. By doing so, the degree of freedom for layout of the image-forming optical system further increases, and the overall size of the image-forming optical apparatus can be further reduced.

In the present invention, the image-forming optical system can be formed from prisms alone. By doing so, the number of components can be reduced, and thus the cost is reduced. It is also possible to integrate a plurality of prisms into one prism with a stop put therebetween. By doing so, the cost can be further reduced.

In the present invention, any of the refracting and reflecting surfaces of the image-forming optical system may be formed from a spherical surface or a rotationally symmetric aspherical surface.

It should be noted that a photographic apparatus can be constructed by placing the above-described image-forming optical system according to the present invention as an objective optical system for photography.

In this case, the arrangement may be such that an image pickup device is placed in the image plane of the objective optical system for photography to convert a received image signal into an electric signal, and an image display device is provided to form an image for observation from the electric signal.

It is also possible to construct a photographic apparatus by placing the above-described image-forming optical system according to the present invention in an objective optical system of a viewing optical system that is provided separately from a photographic optical system In the present invention, it is desirable to arrange the two prisms of the image-forming optical system so that the only one plane of symmetry of at least one free-form surface of the first prism and the only one plane of symmetry of at least one free-form surface of the second prism are formed in approximately the same plane.

In this case, it is desirable that an image pickup device should be placed in an image plane formed by the image-forming optical system to convert a received image signal into an electric signal, and that the image pickup surface of the image pickup device should form a polygon consisting of at least 4 sides, and further that the above-described only one plane of symmetry should be approximately parallel to two mutually opposing sides of the polygon.

In this case, it is desirable that the only one plane of symmetry should lie coincident with a position where the image pickup surface of the image pickup device is in a symmetry between the upper and lower halves or between the right and left halves.

When an optical axis is defined by an axial principal ray emanating from the center of the object and passing through the center of the stop to reach the center of the image plane, the image-forming optical system may be arranged so that the optical path of the optical axis in the first prism from the object side and the optical path of the optical axis in the second prism from the object side are formed in the only one plane of symmetry.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
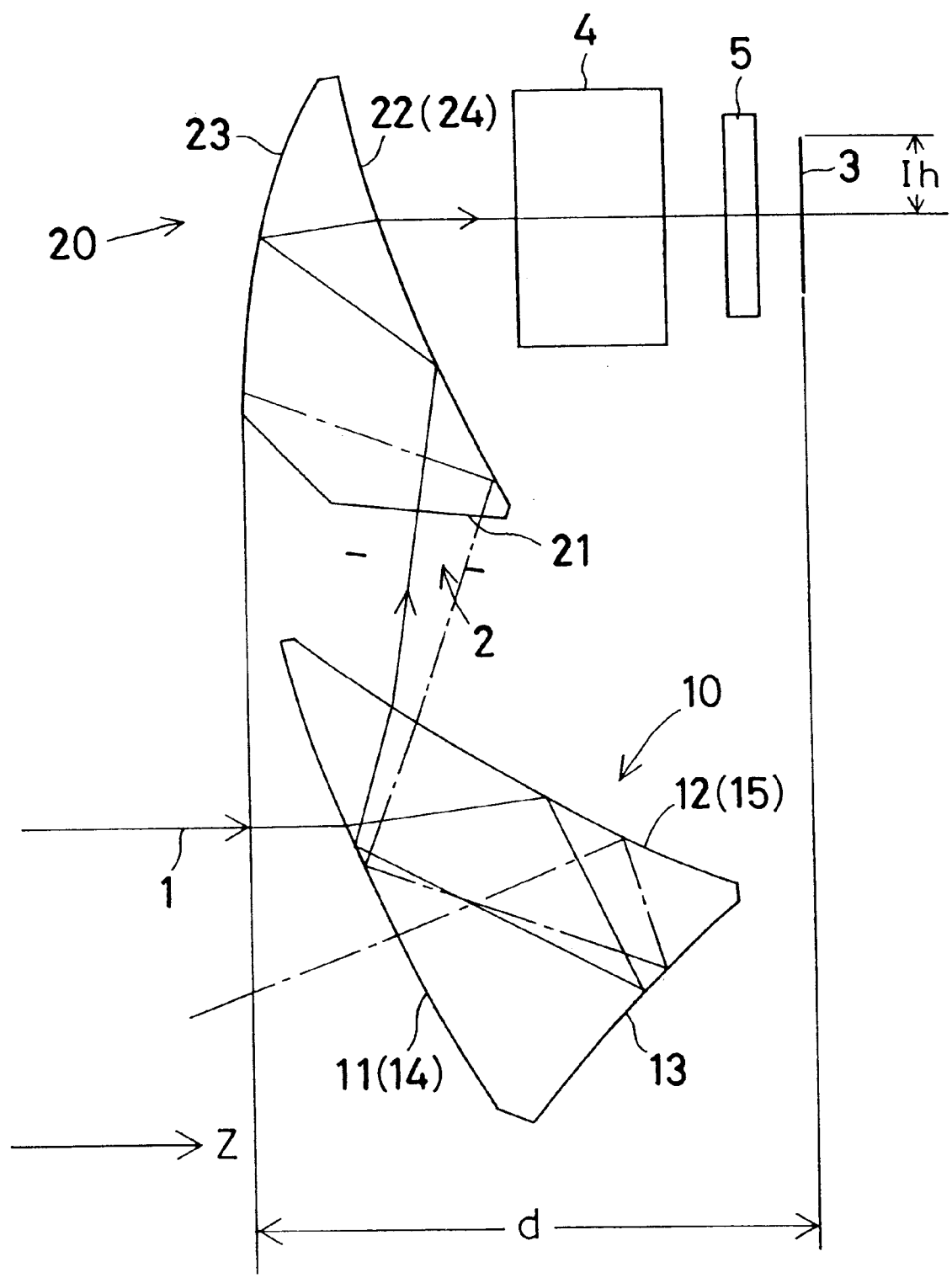
FIG. 1 is a ray path diagram showing a typical arrangement of the image-forming optical system according to the present invention.
Figure 2:
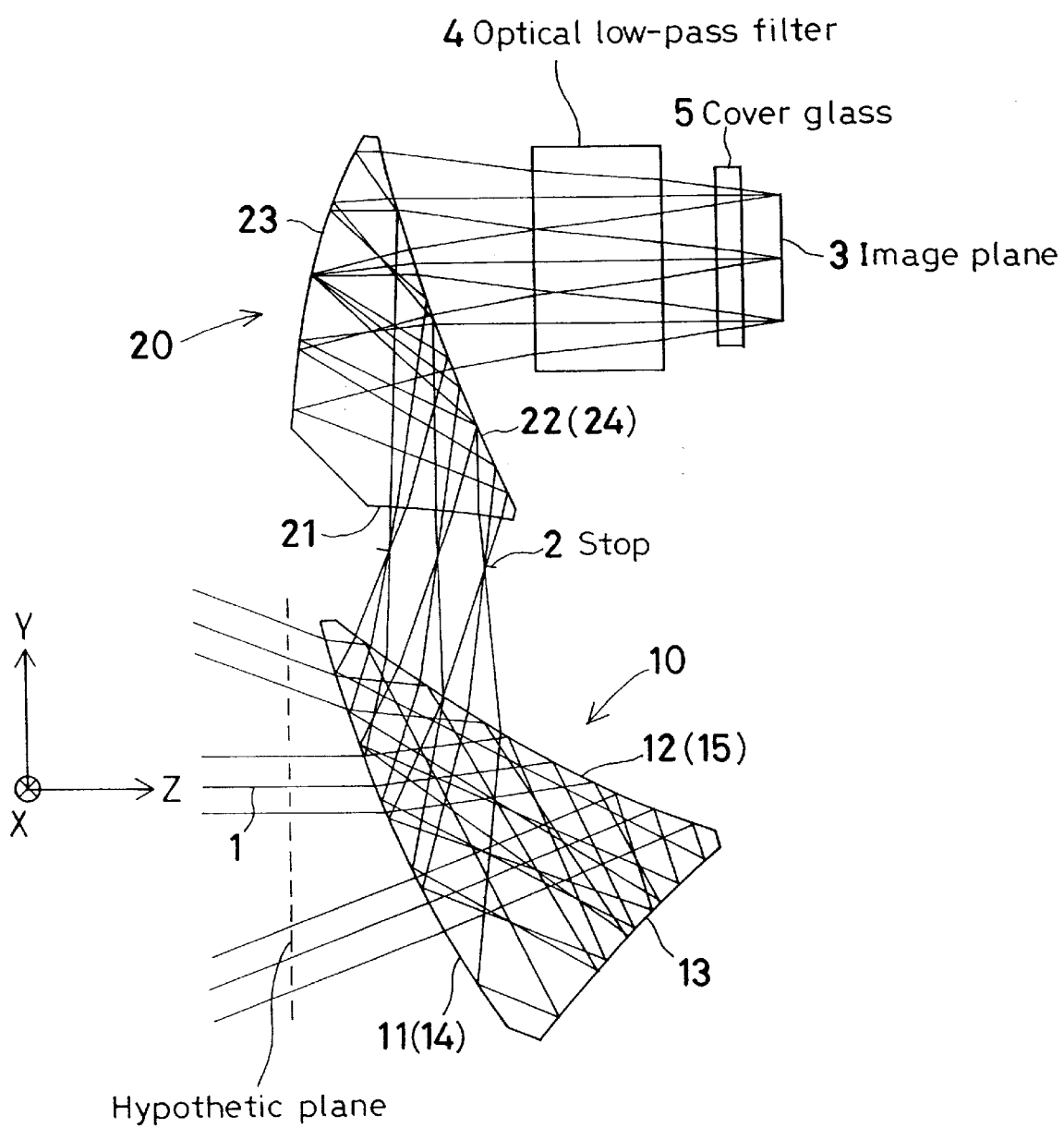
FIG. 2 is a sectional view of an image-forming optical system according to Example 1 of the present invention.
Figure 3:
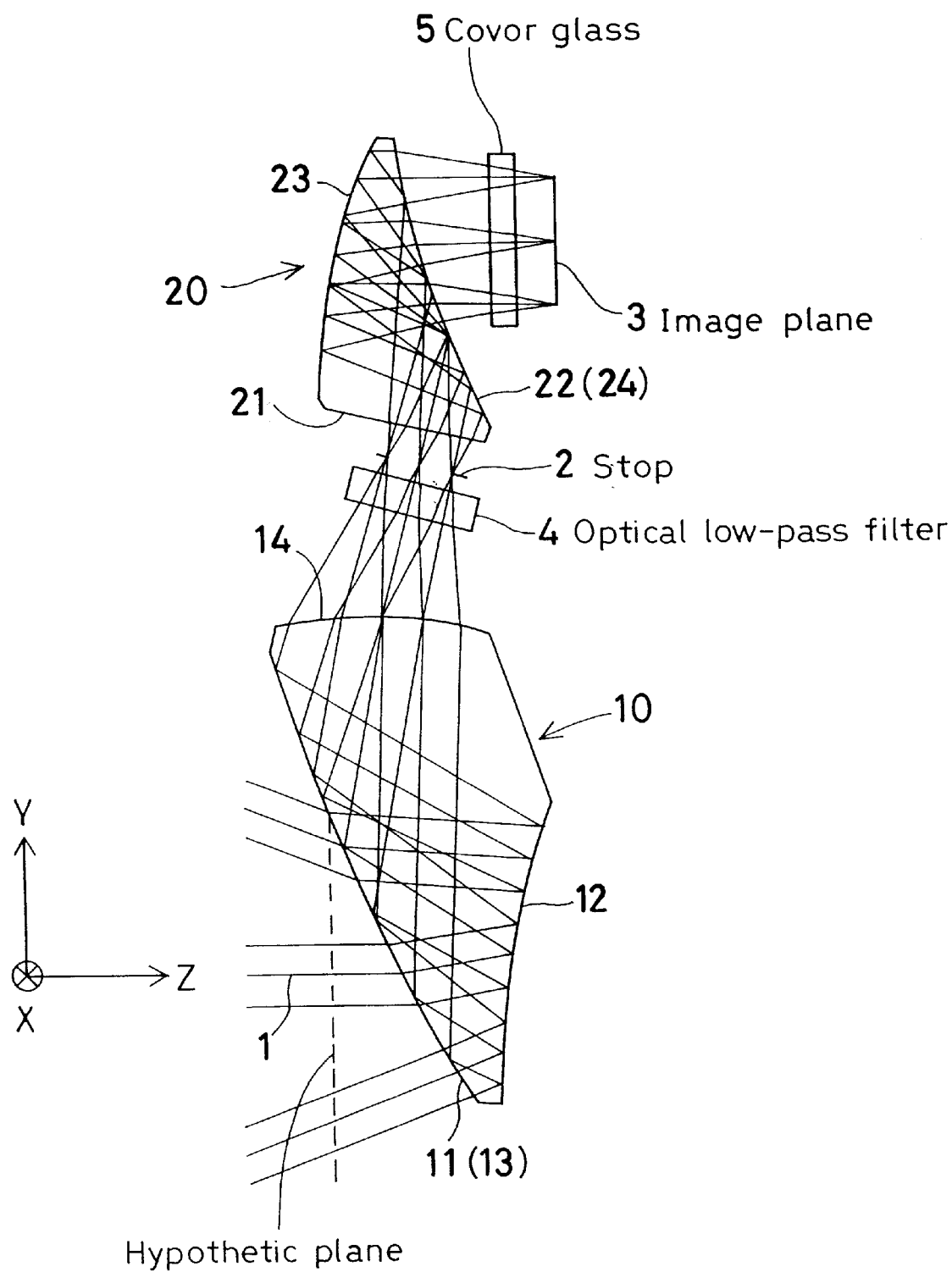
FIG. 3 is a sectional view of an image-forming optical system according to Example 2 of the present invention.

Examples 1 and 2 of the image-forming optical system according to the present invention will be described below. It should be noted that constituent parameters of these examples will be shown later. In Examples 1 and 2, as shown in FIGS. 2 and 3, the center of a specific surface of the optical system [each of the hypothetic plane of surface No. 1 and the stop plane of surface No. 7 (Example 1) and surface No. 8 (Example 2)] is defined as the origin of a decentered optical system, and an axial principal ray 1 is defined by a ray emanating from the center of an object and passing through the center of a stop 2. A Z-axis is taken in the direction in which the axial principal ray 1 travels from the object center to the first surface of the optical system. A plane containing the Z-axis and the center of the image plane is defined as a YZ-plane. A Y-axis is taken in a direction in a plane in which rays are folded by the surfaces of the optical system so that the Y-axis perpendicularly intersects the Z-axis in the YZ-plane. The direction in which the Z-axis extends from the object point toward the first surface of the optical system is defined as a positive direction of the Z-axis. The upward direction as viewed in FIGS. 2 and 3 is defined as a positive direction of the Y-axis. An axis that constitutes a right-handed orthogonal coordinate system in combination with the Y- and Z-axes is defined as an X-axis.

In Examples 1 and 2, decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+\ldots \quad (b)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D ... are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (c). The Z-axis of the defining equation (c) is the axis of Zernike polynomial. A rotationally asymmetric surface is defined by polar coordinates of the height of the Z-axis with respect to the XY-plane. In the equation (c), A is the distance from the Z-axis in the XY-plane, and R is the azimuth angle about the Z-axis, which is expressed by the angle of rotation measured from the Z-axis.

$$X = R \times \cos(A) \qquad (c)$$

$$Y = R \times \sin(A)$$

$$\begin{aligned}Z = &\, D_2 \\
&+D_3 R\cos(A) + D_4 R\sin(A) + D_5 R^2\cos(2A) + D_6(R^2-1) \\
&+D_7 R^2\sin(2A) + D_8 R^3\cos(3A) + D_9(3R^3-2R)\cos(A) \\
&+D_{10}(3R^3-2R)\sin(A) + D_{11}R^3\sin(3A) + D_{12}R^4\cos(4A) \\
&+D_{13}(4R^4-3R^2)\cos(2A) + D_{14}(6R^4-6R^2+1) \\
&+D_{15}(4R^4-3R^2)\sin(2A) + D_{16}R^4\sin(4A) + D_{17}R^5\cos(5A) \\
&+D_{18}(5R^5-4R^3)\cos(3A) + D_{19}(10R^5-12R^3+3R)\cos(A) \\
&+D_{20}(10R^5-12R^3+3R)\sin(A) + D_{21}(5R^5-4R^3)\sin(3A) \\
&+D_{22}R^5\sin(5A) + D_{23}R^6\cos(6A) + D_{24}(6R^6-5R^4)\cos(4A) \\
&+D_{25}(15R^6-20R^4+6R^2)\cos(2A) \\
&+D_{26}(20R^6-30R^4+12R^2-1) \\
&+D_{27}(15R^6-20R^4+6R^2)\sin(2A) + D_{28}(6R^6-5R^4)\sin(4A) \\
&+D_{29}R^6\sin(6A)\end{aligned}$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ ... should be used.

Other examples of surfaces usable in the present invention are expressed by the following defining equation (d):

$$Z=\Sigma\Sigma C_{nm}XY$$

Assuming that k=7 (polynomial of degree 7), for example, a free-form surface is expressed by an expanded form of the above equation as follows:

$$Z = C_2 \quad (d)$$
$$+ C_3Y + C_4|X| + C_5Y^2 + C_6Y|X| + C_7X^2 + C_8Y^3 + C_9Y^2|X|$$
$$+ C_{10}YX^2 + C_{11}|X^3| + C_{12}Y^4 + C_{13}Y^3|X| + C_{14}Y^2X^2$$
$$+ C_{15}Y|X^3| + C_{16}X^4 + C_{17}Y^5 + C_{18}Y^4|X| + C_{19}Y^3X^2$$
$$+ C_{20}Y^2|X^3| + C_{21}YX^4 + C_{22}|X^5| + C_{23}Y^6 + C_{24}Y^5|X|$$
$$+ C_{25}Y^4X^2 + C_{26}Y^3|X^3| + C_{27}Y^2X^4 + C_{28}Y|X^5| + C_{29}X^6$$
$$+ C_{30}Y^7 + C_{31}Y^6|X| + C_{32}Y^5X^2 + C_{33}Y^4|X^3| + C_{34}Y^3X^4$$
$$+ C_{35}Y^2|X^5| + C_{36}YX^6 + C_{37}|X^7|$$

Although in the examples of the present invention the surface configuration is expressed by a free-form surface using the above equation (a), it should be noted that the same advantageous effect can be obtained by using the above equation (c) or (d).

In Examples 1 and 2, it is assumed that an image pickup device of 1/3 inch size in which the image size is about 2.5×1.8 millimeters is used. It should be noted that the present invention is also applicable to image pickup devices of other sizes. The present invention includes not only an image pickup optical system using the image-forming optical system according to the present invention but also an image pickup apparatus incorporating the optical system.

FIG. 2 is a sectional view of Example 1 taken along the YZ-plane containing the axial principal ray. In Example 1, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Example 1 has, in the order in which light passes from the object side, a first prism 10, a stop 2, a second prism 20, an optical low-pass filter 4, a cover glass 5 for protecting the imager surface, and an image plane (imager light-receiving surface) 3. The first prism 10 has a first transmitting surface 11 of positive power, a first reflecting surface 12 of negative power, a second reflecting surface 13, a third reflecting surface 14 of positive power, and a second transmitting surface 15 of negative power. The second prism 20 has a first transmitting surface 21 of negative power, a first reflecting surface 22 of negative power, a second reflecting surface 23 of positive power, and a second transmitting surface 24 of negative power. The first transmitting surface 11 and third reflecting surface 14 of the first prism 10 are the identical optical surface having both transmitting and reflecting actions. In addition, the first reflecting surface 12 and second transmitting surface 15 of the first prism 10 are the identical optical surface having both transmitting and reflecting actions. Further, the first reflecting surface 22 and second transmitting surface 24 of the second prism 20 are the identical optical surface having both transmitting and reflecting actions.

In the constituent parameters (shown later), the displacements of each of the surface Nos. 2 to 7 are expressed by the amounts of displacement from the decentration reference plane 1, and the displacements of each of the surface Nos. 8 to 12 are expressed by the amounts of displacement from the decentration reference plane 2. The image plane 3 is perpendicular to the Z-axis.

FIG. 3 is a sectional view of Example 2 taken along the YZ-plane containing the axial principal ray. In this example, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

Example 2 has, in the order in which light passes from the object side, a first prism 10, an optical low-pass filter 4, a stop 2, a second prism 20, a cover glass 5 for protecting the imager surface, and an image plane (imager light-receiving surface) 3. The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21 of positive power, a first reflecting surface 22 of negative power, a second reflecting surface 23 of positive power, and a second transmitting surface 24 of negative power. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions.

In the constituent parameters (shown later), the displacements of each of the surface Nos. 2 to 6 are expressed by the amounts of displacement from the decentration reference plane 1, and the displacements of each of the surface Nos. 9 to 13 are expressed by the amounts of displacement from the decentration reference plane 2. The image plane 3 is perpendicular to the Z-axis.

Constituent parameters of the above-described Examples 1 and 2 will be shown below. In the constituent parameters, an object plane is denoted by "OBJ", an image plane by "IMG", free-form surfaces by "FFS", rotationally symmetric aspherical surfaces by "ASS", a stop plane by "STO", reflecting surfaces by "REF", hypothetic planes by "HP", and decentration reference planes by "RP".

EXAMPLE 1

| Surface No. | Radius of curvature | Surface separation | Displacement and tilt | Refractive index | Abbe's No. |
|---|---|---|---|---|---|
| OBJ | ∞ | ∞ | | | |
| 1 | ∞(HP) | | | (RP1) | |
| 2 | FFS①  | | (1) | 1.4924 | 57.6 |
| 3 | FFS②(REF) | | (2) | 1.4924 | 57.6 |
| 4 | FFS③(REF) | | (3) | 1.4924 | 57.6 |
| 5 | FFS①(REF) | | (1) | 1.4924 | 57.6 |
| 6 | FFS② | | (2) | | |
| 7 | ∞(STO) | | (4) | (RP2) | |

-continued

| | | | | | | |
|---|---|---|---|---|---|---|
| 8 | −38.45 | | (5) | | 1.4924 | 57.6 |
| 9 | FFS④(REF) | | (6) | | 1.4924 | 57.6 |
| 10 | FFS⑤(REF) | | (7) | | 1.4924 | 57.6 |
| 11 | FFS⑥ | | (6) | | | |
| 12 | ∞ | 3.92 | (8) | | 1.5163 | 64.1 |
| 13 | ∞ | 1.60 | | | | |
| | (Optical low-pass filter) | | | | | |
| 14 | ∞ | 0.75 | | | 1.4875 | 70.2 |
| 15 | ∞ | 1.21 | | | | |
| | (Cover glass) | | | | | |
| I MG | ∞ | | | | | |

FFS①

| | | | | | |
|---|---|---|---|---|---|
| $C_4$ | $1.6583 \times 10^{-2}$ | $C_6$ | $1.0361 \times 10^{-2}$ | $C_8$ | $-1.4529 \times 10^{-4}$ |
| $C_{10}$ | $-1.3257 \times 10^{-4}$ | $C_{11}$ | $-4.0244 \times 10^{-5}$ | $C_{13}$ | $-2.5591 \times 10^{-5}$ |
| $C_{15}$ | $3.2999 \times 10^{-6}$ | $C_{17}$ | $3.0940 \times 10^{-6}$ | $C_{19}$ | $-6.7426 \times 10^{-6}$ |
| $C_{21}$ | $-1.5816 \times 10^{-7}$ | | | | |

FFS②

| | | | | | |
|---|---|---|---|---|---|
| $C_4$ | $1.0040 \times 10^{-2}$ | $C_6$ | $1.1058 \times 10^{-2}$ | $C_8$ | $2.9636 \times 10^{-4}$ |
| $C_{10}$ | $-3.1738 \times 10^{-4}$ | $C_{11}$ | $-2.5492 \times 10^{-5}$ | $C_{13}$ | $-9.1474 \times 10^{-5}$ |
| $C_{15}$ | $7.7860 \times 10^{-6}$ | $C_{17}$ | $1.8022 \times 10^{-6}$ | $C_{19}$ | $5.9581 \times 10^{-6}$ |
| $C_{21}$ | $3.2781 \times 10^{-7}$ | | | | |

FFS③

| | | | | | |
|---|---|---|---|---|---|
| $C_4$ | $1.2925 \times 10^{-2}$ | $C_6$ | $5.5608 \times 10^{-3}$ | $C_8$ | $2.1288 \times 10^{-4}$ |
| $C_{10}$ | $-9.6679 \times 10^{-4}$ | $C_{11}$ | $-1.4102 \times 10^{-5}$ | $C_{13}$ | $9.1100 \times 10^{-5}$ |
| $C_{15}$ | $-3.3157 \times 10^{-5}$ | $C_{17}$ | $8.0164 \times 10^{-6}$ | $C_{19}$ | $-8.3721 \times 10^{-6}$ |
| $C_{21}$ | $5.6486 \times 10^{-6}$ | | | | |

FFS④

| | | | | | |
|---|---|---|---|---|---|
| $C_4$ | $2.5649 \times 10^{-2}$ | $C_6$ | $1.1135 \times 10^{-2}$ | $C_8$ | $-2.7875 \times 10^{-4}$ |
| C10 | $-4.3334 \times 10^{-7}$ | $C_{11}$ | $-2.0002 \times 10^{-5}$ | $C_{13}$ | $-5.1461 \times 10^{-5}$ |
| C15 | $-7.5060 \times 10^{-6}$ | $C_{17}$ | $-4.6687 \times 10^{-6}$ | $C_{19}$ | $5.9301 \times 10^{-6}$ |
| $C_{21}$ | $-1.8033 \times 10^{-7}$ | | | | |

FFS⑤

| | | | | | |
|---|---|---|---|---|---|
| $C_4$ | $3.0956 \times 10^{-2}$ | $C_6$ | $2.6443 \times 10^{-2}$ | $C_8$ | $2.5954 \times 10^{-4}$ |
| $C_{10}$ | $2.3277 \times 10^{-4}$ | $C_{11}$ | $3.0230 \times 10^{-5}$ | $C_{13}$ | $4.6840 \times 10^{-5}$ |
| $C_{15}$ | $2.8241 \times 10^{-5}$ | $C_{17}$ | $9.1347 \times 10^{-8}$ | $C_{19}$ | $1.6835 \times 10^{-6}$ |
| $C_{21}$ | $1.0256 \times 10^{-6}$ | | | | |

Displacement and tilt(1)

| | | | | | |
|---|---|---|---|---|---|
| X | 0.00 | Y | −0.43 | Z | 3.00 |
| α | 22.99 | β | 0.00 | γ | 0.00 |

Displacement and tilt(2)

| | | | | | |
|---|---|---|---|---|---|
| X | 0.00 | Y | 0.70 | Z | 8.08 |
| α | 62.22 | β | 0.00 | γ | 0.00 |

Displacement and tilt(3)

| | | | | | |
|---|---|---|---|---|---|
| X | 0.00 | Y | −4.33 | Z | 10.63 |
| α | −45.13 | β | 0.00 | γ | 0.00 |

Displacement and tilt(4)

| | | | | | |
|---|---|---|---|---|---|
| X | 0.00 | Y | 6.70 | Z | 4.62 |
| α | 81.22 | β | 0.00 | γ | 0.00 |

Displacement and tilt(5)

| | | | | | |
|---|---|---|---|---|---|
| X | 0.00 | Y | 0.00 | Z | 1.32 |
| α | 2.92 | β | 0.00 | γ | 0.00 |

Displacement and tilt(6)

| | | | | | |
|---|---|---|---|---|---|
| X | 0.00 | Y | 0.06 | Z | 5.14 |
| α | −58.50 | β | 0.00 | γ | 0.00 |

Displacement and tilt(7)

| | | | | | |
|---|---|---|---|---|---|
| X | 0.00 | Y | 4.97 | Z | 7.74 |
| α | −96.58 | β | 0.00 | γ | 0.00 |

Displacement and tilt(8)

| | | | | | |
|---|---|---|---|---|---|
| X | 0.00 | Y | −1.63 | Z | 9.09 |
| α | −81.23 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| OBJ | ∞ | ∞ | | | |
| 1 | ∞(HP) | | (RF 1) | | |
| 2 | FFS① | | (1) | 1.4924 | 57.6 |
| 3 | FFS②(REF) | | (2) | 1.4924 | 57.6 |
| 4 | FFS①(REF) | | (1) | 1.4924 | 57.6 |
| 5 | ASS① | | (3) | | |
| 6 | ∞ | 1.00 | (4) | 1.4924 | 57.6 |
| 7 | ∞ | 0.50 | | | |
| | (Optical low-pass filter) | | | | |
| 8 | ∞(STO) | | (RP 2) | | |
| 9 | ASS② | | (5) | 1.4924 | 57.6 |
| 10 | FFS③(REF) | | (6) | 1.4924 | 57.6 |
| 11 | FFS④(REF) | | (7) | 1.4924 | 57.6 |
| 12 | FFS③ | | (6) | | |
| 13 | ∞ | 0.75 | (8) | 1.4875 | 70.2 |
| 14 | ∞ | 1.21 | | | |
| | (Cover glass) | | | | |
| I MG | ∞ | | | | |

ASS①
R   −9.69
K   0.0000
A   $5.7365 \times 10^{-4}$
B   $-6.2259 \times 10^{-6}$
C   $9.9952 \times 10^{-8}$
D   $-6.7329 \times 10^{-10}$ ASS②
R   241.31
K   0.0000
A   $-5.8239 \times 10^{-4}$
B   $1.3867 \times 10^{-4}$
C   $-9.4417 \times 10^{-6}$
D   $2.5524 \times 10^{-7}$

FFS①

| | | | | | |
|---|---|---|---|---|---|
| $C_4$ | $7.9105 \times 10^{-3}$ | $C_6$ | $5.8456 \times 10^{-3}$ | $C_8$ | $-8.2836 \times 10^{-6}$ |
| $C_{10}$ | $-1.7361 \times 10^{-4}$ | $C_{11}$ | $-2.5521 \times 10^{-6}$ | $C_{13}$ | $-2.2102 \times 10^{-5}$ |
| $C_{15}$ | $1.3676 \times 10^{-5}$ | $C_{17}$ | $4.7297 \times 10^{-6}$ | $C_{19}$ | $-5.5491 \times 10^{-7}$ |
| $C_{21}$ | $-1.0642 \times 10^{-6}$ | | | | |

FFS②

| | | | | | |
|---|---|---|---|---|---|
| $C_4$ | $1.1670 \times 10^{-2}$ | $C_6$ | $1.5926 \times 10^{-2}$ | $C_8$ | $-6.3243 \times 10^{-5}$ |
| $C_{10}$ | $-8.1559 \times 10^{-4}$ | $C_{11}$ | $3.2830 \times 10^{-6}$ | $C_{13}$ | $-2.6658 \times 10^{-5}$ |
| $C_{15}$ | $1.6086 \times 10^{-4}$ | $C_{17}$ | $6.2610 \times 10^{-6}$ | $C_{19}$ | $6.8933 \times 10^{-7}$ |
| $C_{21}$ | $-1.4004 \times 10^{-5}$ | | | | |

FFS③

| | | | | | |
|---|---|---|---|---|---|
| $C_4$ | $1.4319 \times 10^{-2}$ | $C_6$ | $6.6299 \times 10^{-3}$ | $C_8$ | $-8.7012 \times 10^{-5}$ |
| $C_{10}$ | $3.5430 \times 10^{-4}$ | $C_{11}$ | $2.2861 \times 10^{-5}$ | $C_{13}$ | $4.0481 \times 10^{-5}$ |
| $C_{15}$ | $1.1692 \times 10^{-4}$ | $C_{17}$ | $2.3745 \times 10^{-5}$ | $C_{19}$ | $-2.3469 \times 10^{-5}$ |
| $C_{21}$ | $-7.4046 \times 10^{-6}$ | | | | |

FFS④

| | | | | | |
|---|---|---|---|---|---|
| $C_4$ | $3.4614 \times 10^{-2}$ | $C_6$ | $2.9441 \times 10^{-2}$ | $C_8$ | $2.6927 \times 10^{-4}$ |
| $C_{10}$ | $6.4034 \times 10^{-4}$ | $C_{11}$ | $4.4102 \times 10^{-5}$ | $C_{13}$ | $9.9462 \times 10^{-6}$ |
| $C_{15}$ | $2.5689 \times 10^{-4}$ | $C_{17}$ | $8.8311 \times 10^{-6}$ | $C_{19}$ | $-1.6809 \times 10^{-7}$ |
| $C_{21}$ | $2.1963 \times 10^{-5}$ | | | | |

Displacement and tilt(1)

| X | 0.00 | Y | 3.75 | Z | 0.50 |
|---|---|---|---|---|---|
| α | 23.90 | β | 0.00 | γ | 0.00 |

Displacement and tilt(2)

| X | 0.00 | Y | 0.56 | Z | 5.62 |
|---|---|---|---|---|---|
| α | −11.23 | β | 0.00 | γ | 0.00 |

Displacement and tilt(3)

| X | 0.00 | Y | 10.10 | Z | 3.87 |
|---|---|---|---|---|---|
| α | 77.63 | β | 0.00 | γ | 0.00 |

Displacement and tilt(4)

| X | 0.00 | Y | 13.24 | Z | 2.47 |
|---|---|---|---|---|---|
| α | 74.91 | β | 0.00 | γ | 0.00 |

-continued

|   |        | Displacement and tilt(5) |       |   |      |
|---|--------|--------------------------|-------|---|------|
| X | 0.00   | Y                        | −1.92 | Z | 1.18 |
| α | 4.42   | β                        | 0.00  | γ | 0.00 |
|   |        | Displacement and tilt(6) |       |   |      |
| X | 0.00   | Y                        | 0.07  | Z | 3.91 |
| α | −53.98 | β                        | 0.00  | γ | 0.00 |
|   |        | Displacement and tilt(7) |       |   |      |
| X | 0.00   | Y                        | 4.09  | Z | 5.31 |
| α | −89.11 | β                        | 0.00  | γ | 0.00 |
|   |        | Displacement and tilt(8) |       |   |      |
| X | 0.00   | Y                        | −0.42 | Z | 6.81 |
| α | −74.91 | β                        | 0.00  | γ | 0.00 |

Figure 4:
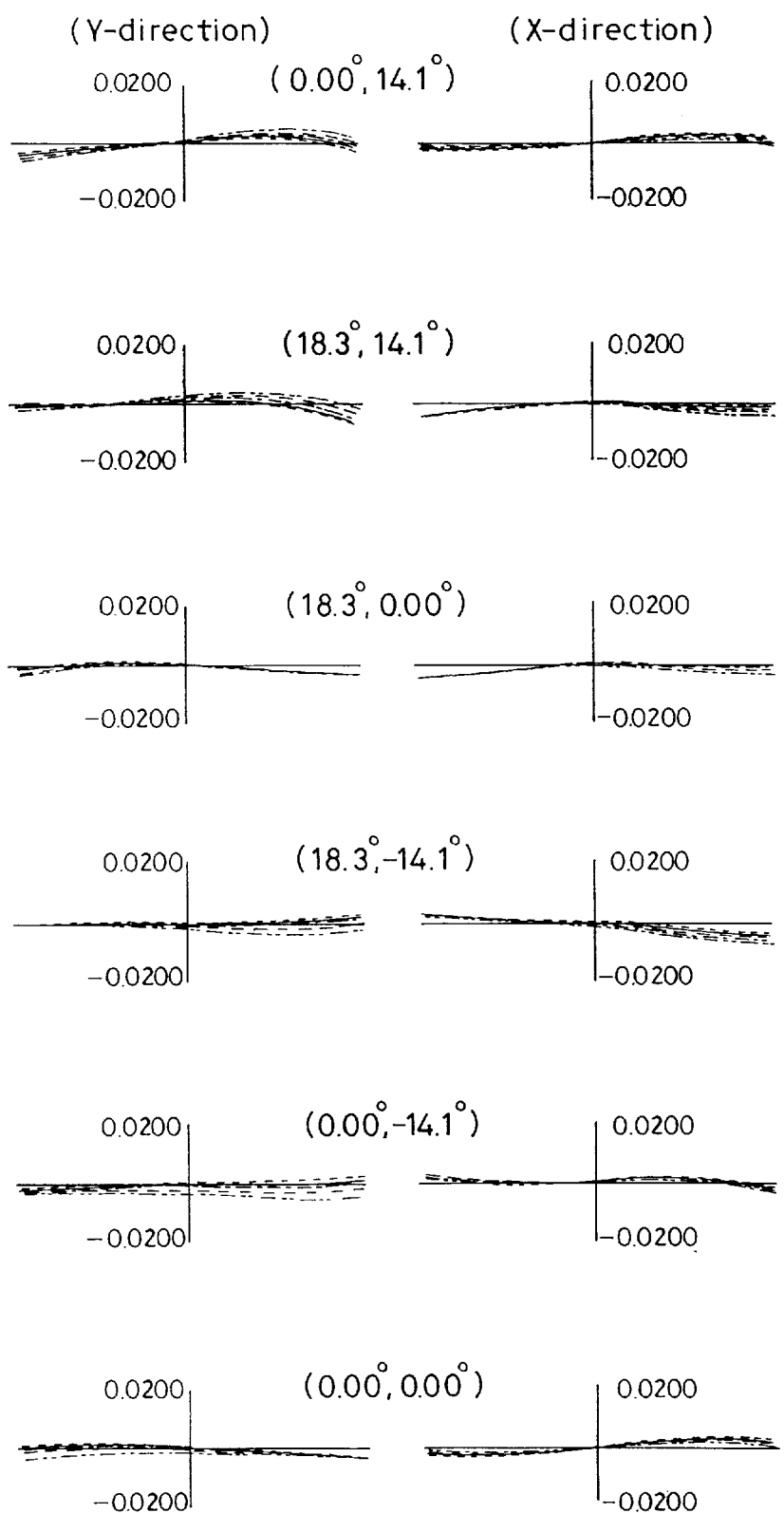
FIG. 4 is an aberrational diagram showing lateral aberrations in the image-forming optical system according to Example 1.
Figure 5:
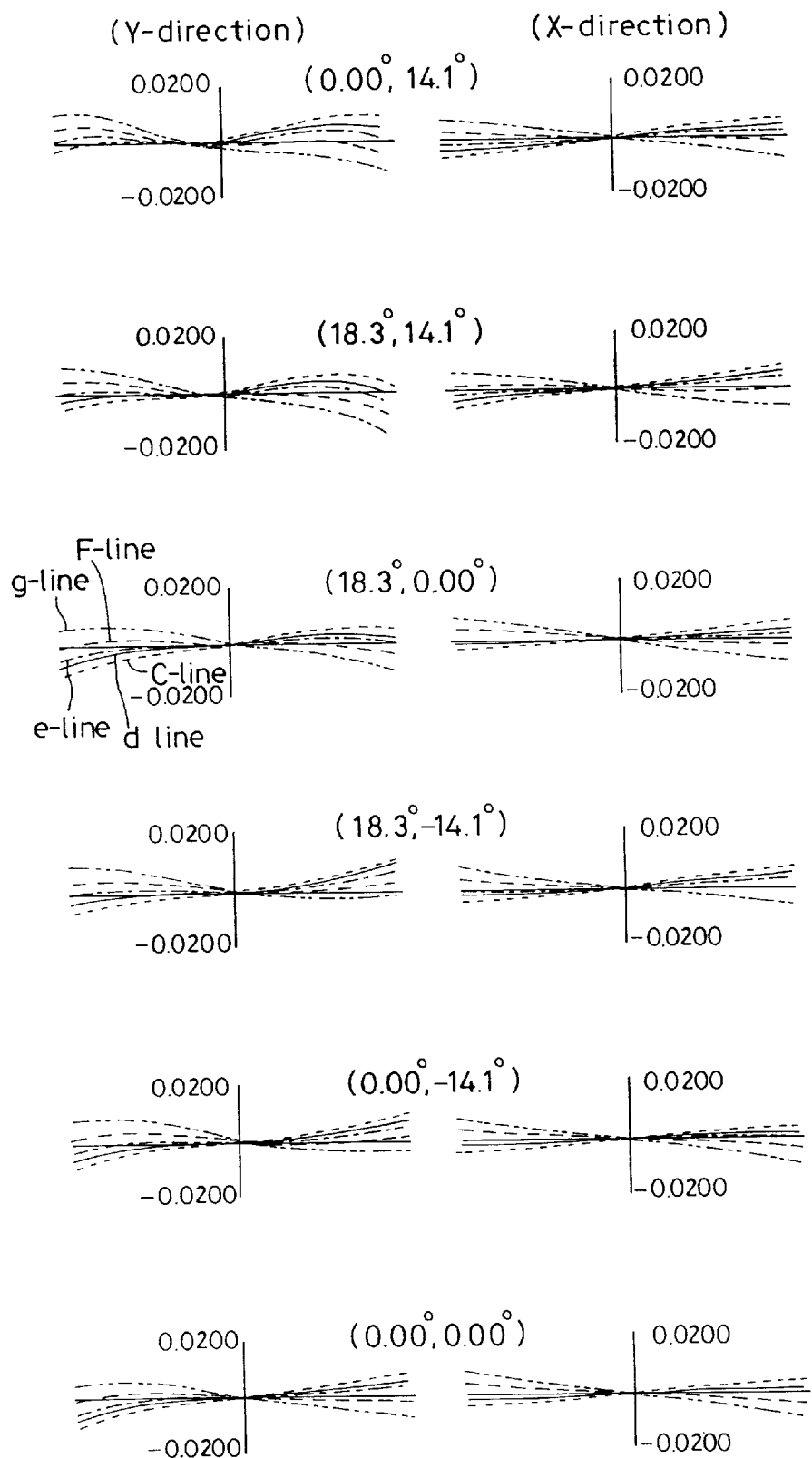
FIG. 5 is an aberrational diagram showing lateral aberrations in the image-forming optical system according to Example 2.

FIGS. 4 and 5 are aberrational diagrams showing lateral aberrations in the above-described Examples 1 and 2. In these aberrational diagrams, the numerals in the parentheses denote [horizontal (X-direction) field angle, vertical (Y-direction) field angle], and lateral aberrations at the field angles are shown. Each aberrational diagram shows, in order from the bottom toward the top of the diagram, lateral aberrations in the center of the image field; lateral aberrations at the position of minus about 70% of the image height on the Y-axis; lateral aberrations at the position of about 70% of the image height in the X-direction and minus about 70% of the image height in the Y-direction; lateral aberrations at the position of about 70% of the image height on the X-axis; lateral aberrations at the position of about 70% of the image height in the X-direction and about 70% of the image height in the Y-direction; and lateral aberrations at the position of about 70% of the image height on the Y-axis.

Table below shows the values of the conditions (1), (3), (5), (8), (10) and (12) in the above-described Examples 1 and 2.

| Conditions |                     | Ex. 1 | Ex. 2 | Prior art 1 | Prior art 2 |
|------------|---------------------|-------|-------|-------------|-------------|
| (1)        |                     | 4.9   | 2.8   | 5.8         | 7.6         |
| (3)        |                     | 1.63  | 1.47  | 0           | 0.14        |
| (5)        | first prism         | 81.22 | 74.91 | 90          | 0           |
|            | second prism        | 81.22 | 74.91 | 90          | 0           |
| (8)        | 1st reflecting surface | 54.60 | 20.71 | 22.5 | 22.5 |
|            | 2nd reflecting surface | 18.05 | 55.85 | 22.5 | 22.5 |
|            | 3rd reflecting surface | 50.17 | 55.31 |      |      |
|            | 4th reflecting surface | 59.46 | 20.18 |      |      |
|            | 5th reflecting surface | 21.38 |       |      |      |
| (10)       | 1st refracting surface | 0.10 | 0.05 | 0.15 | 0.51 |
|            |                     | 0.06  | 0.04  |       |       |
|            | 2nd refracting surface | 0.06 | 0.16 | 0.67 | 1.44 |
|            |                     | 0.07  |       |       |       |
|            | 3rd refracting surface | 0.04 | 0.01 | 0.67 | 1.28 |
|            | 4th refracting surface | 0.16 | 0.09 | 0.21 | 0.01 |
|            |                     | 0.06  | 0.04  |       |       |
| (12)       | 1st refracting surface | 22.98 | 27.51 | 0 | 0 |
|            | 2nd refracting surface | 15.77 | 9.66  | 0 | 0 |
|            | 3rd refracting surface | 2.92  | 4.02  | 0 | 0 |
|            | 4th refracting surface | 11.88 | 11.83 | 0 | 0 |

Note)
Prior art 1: Example 1 of JP(A) 10-68884
Prior art 2: Example 7 of JP(A) 10-68884
Condition (10) : in the case of free-form surface,
Upper row: X-axis direction
Lower row: Y-axis direction The first prism 10 and the second prism 20, which constitute the image-forming optical systems according to the present invention in the above-described examples are of the type in which there are two or three internal reflections and which has three optical surfaces, one or two of which are each formed from a surface having both a totally reflecting action and a transmitting action. It should, however, be noted that prisms usable in the present invention are not necessarily limited to the described type. Some examples of prisms usable in the present invention will be described below with reference to FIGS. 6 to 11. In all the following examples, the prisms will be described as a prism P that forms an image on an image plane 36. It should, however, be noted that these prisms are also usable as a prism P in which rays from a subject enter the prism P from the image plane side (36) and an image is formed on the pupil side (31), by reversing the illustrated optical path.

Figure 6:
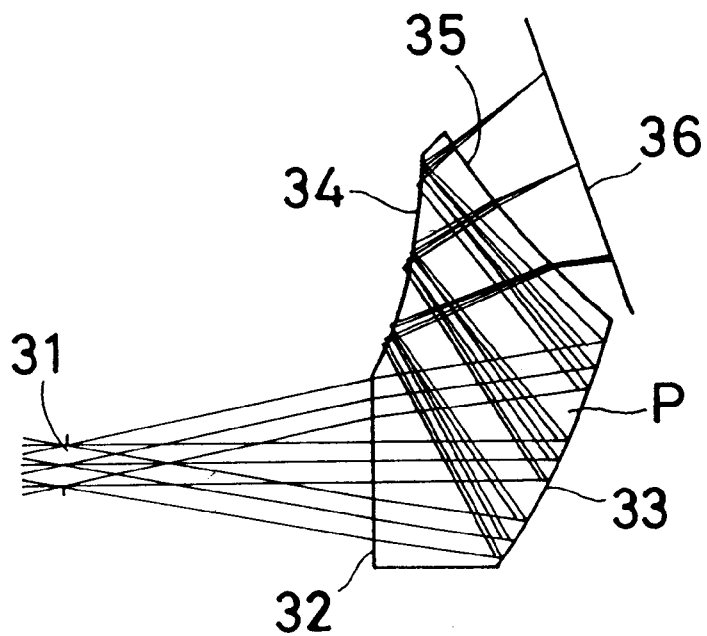
FIG. 6 is a diagram showing one example of decentered prisms applicable to the present invention.

In the case of FIG. 6, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is refracted by the fourth surface 35 to form an image on an image plane 36.

Figure 7:
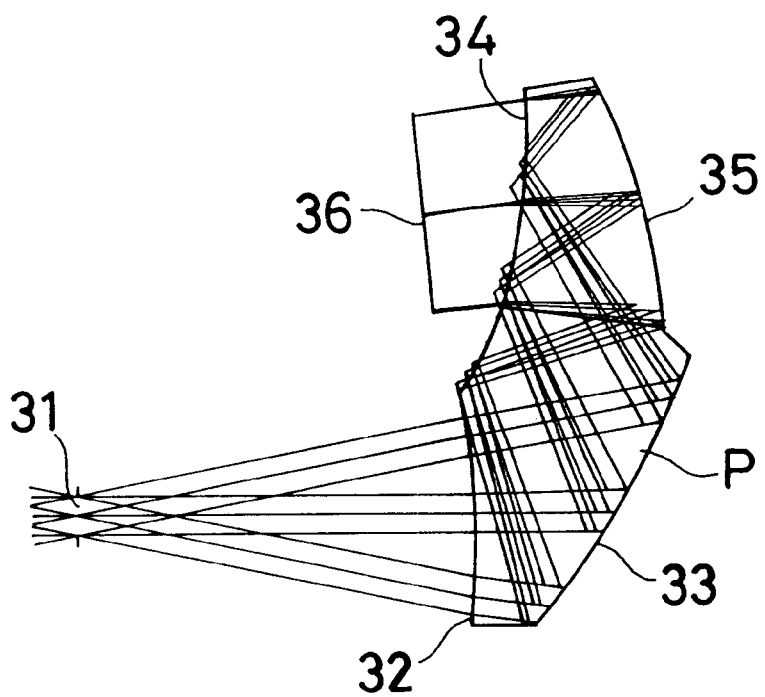
FIG. 7 is a diagram showing another example of decentered prisms applicable to the present invention.

In the case of FIG. 7, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and then totally reflected by the third surface 34. The reflected light is internally reflected by the fourth surface 35 and then refracted by the third surface 34 to form an image on an image plane 36.

Figure 8:
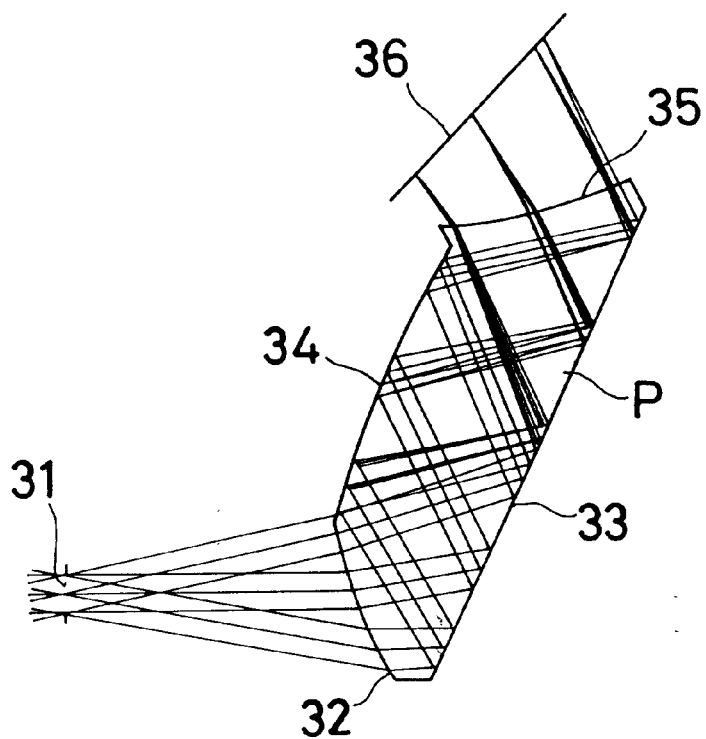
FIG. 8 is a diagram showing another example of decentered prisms applicable to the present invention.

In the case of FIG. 8, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then refracted by the fourth surface 35 to form an image on an image plane 36.

Figure 9:
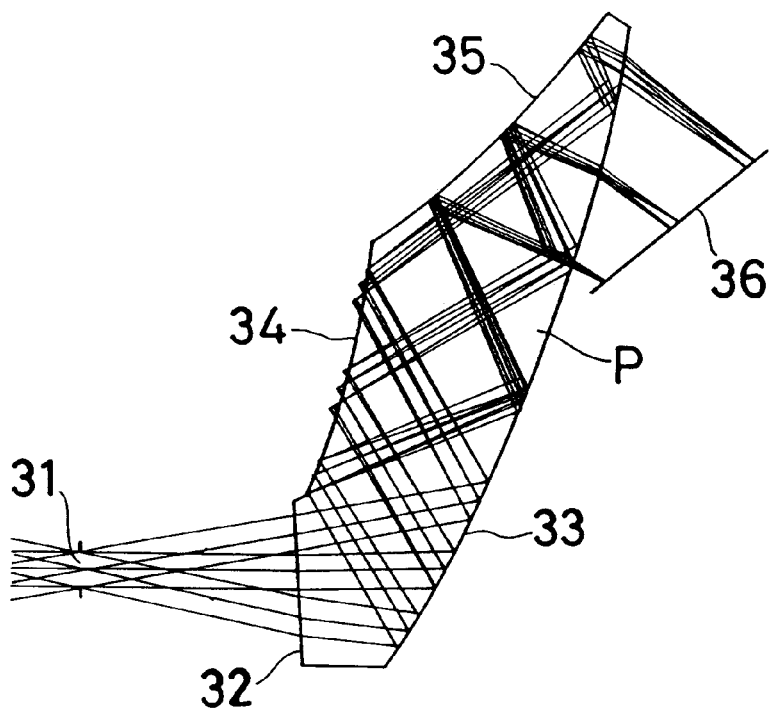
FIG. 9 is a diagram showing another example of decentered prisms applicable to the present invention.

In the case of FIG. 9, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then internally reflected by the fourth surface 35. The reflected light is then refracted by the second surface 33 to form an image on an image plane 36.

Figure 10:
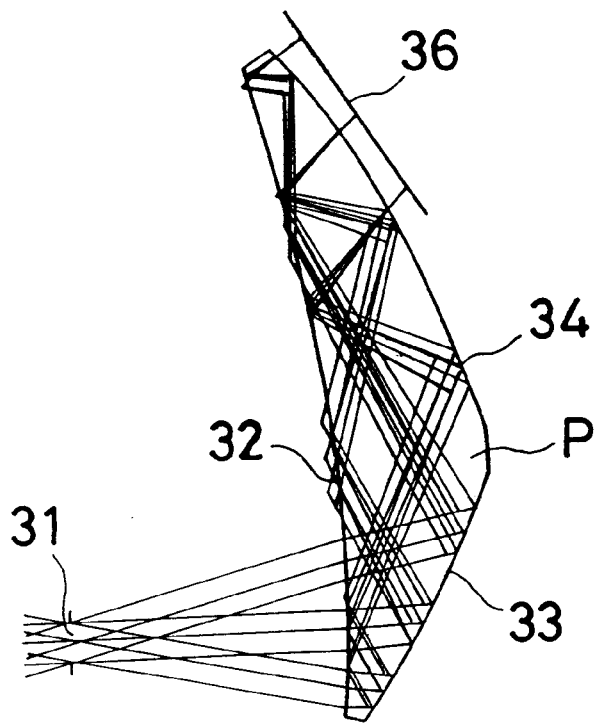
FIG. 10 is a diagram showing another example of decentered prisms applicable to the present invention.

In the case of FIG. 10, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. Then, the reflected light is refracted by the third surface 34 to form an image on an image plane 36.

Figure 11:
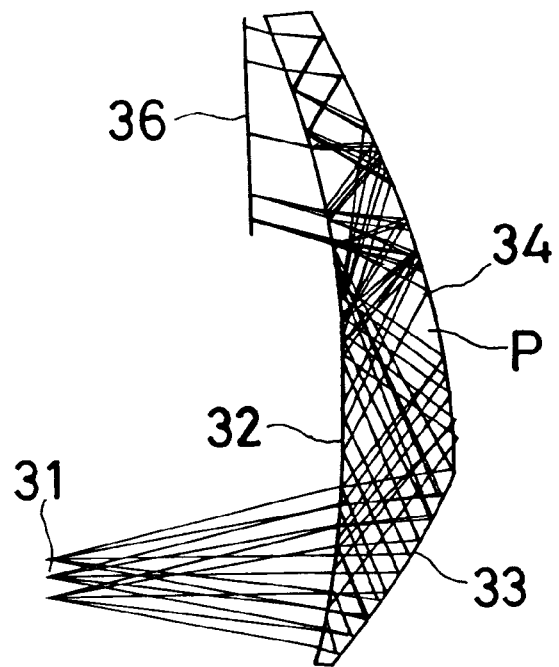
FIG. 11 is a diagram showing another example of decentered prisms applicable to the present invention.

In the case of FIG. 11, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. The reflected light is internally reflected by the third surface 34 and then refracted by the first surface 32 to form an image on an image plane 36.

Incidentally, the above-described image-forming optical system according to the present invention can be used in photographic apparatuses, particularly cameras, in which an object image formed by the image-forming optical system is received with an image pickup device, such as a CCD or a silver halide film, to take a photograph of the object. It is also possible to use the image-forming optical system as an objective optical system of an observation apparatus in which an object image is viewed through an ocular lens, particularly a finder unit of a camera. Embodiments in which the present invention is applied to such apparatuses will be described below.

Figure 12:
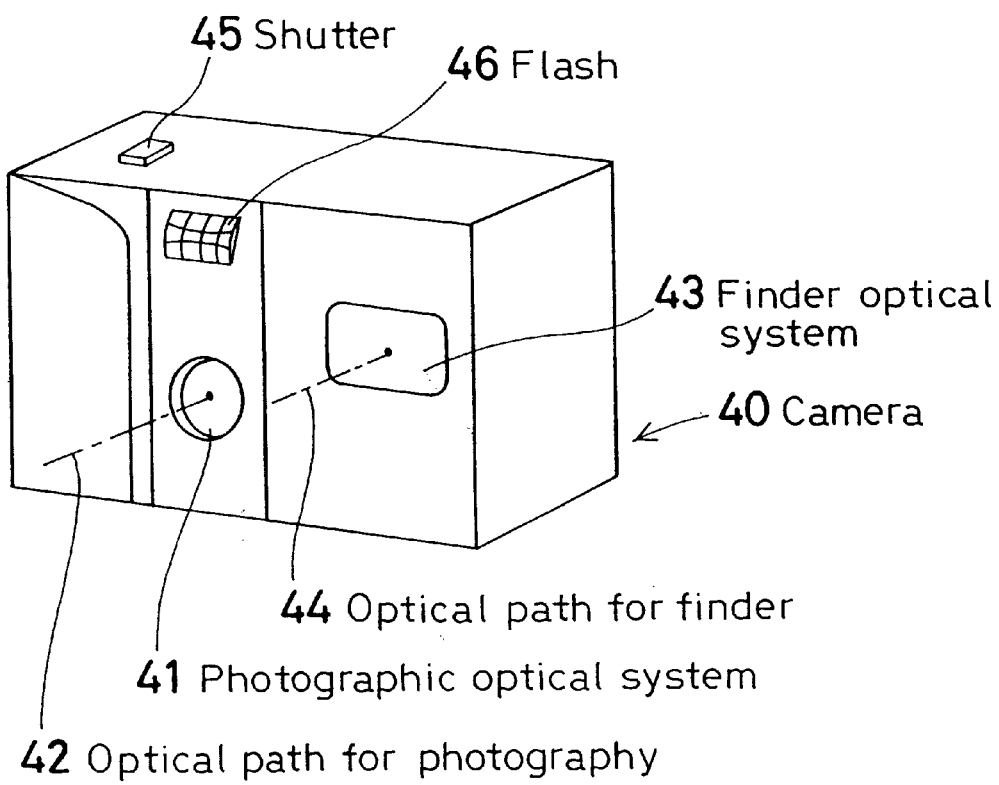
FIG. 12 is a perspective view showing the external appearance of an electronic camera to which an image-forming optical system according to the present invention is applied, as viewed from the front side thereof.
Figure 13:
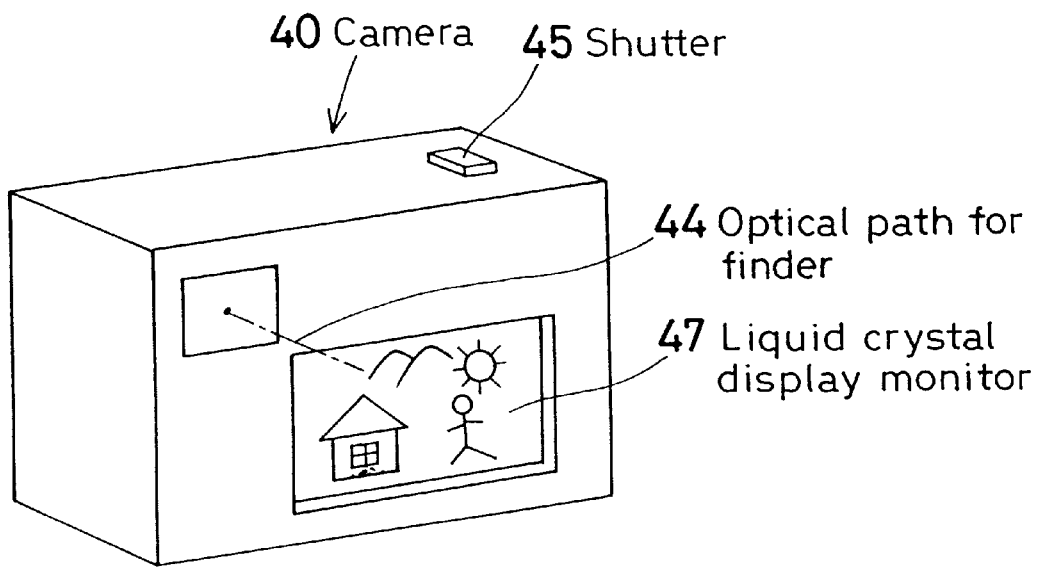
FIG. 13 is a perspective view of the electronic camera shown in FIG. 12, as viewed from the rear side thereof.
Figure 14:
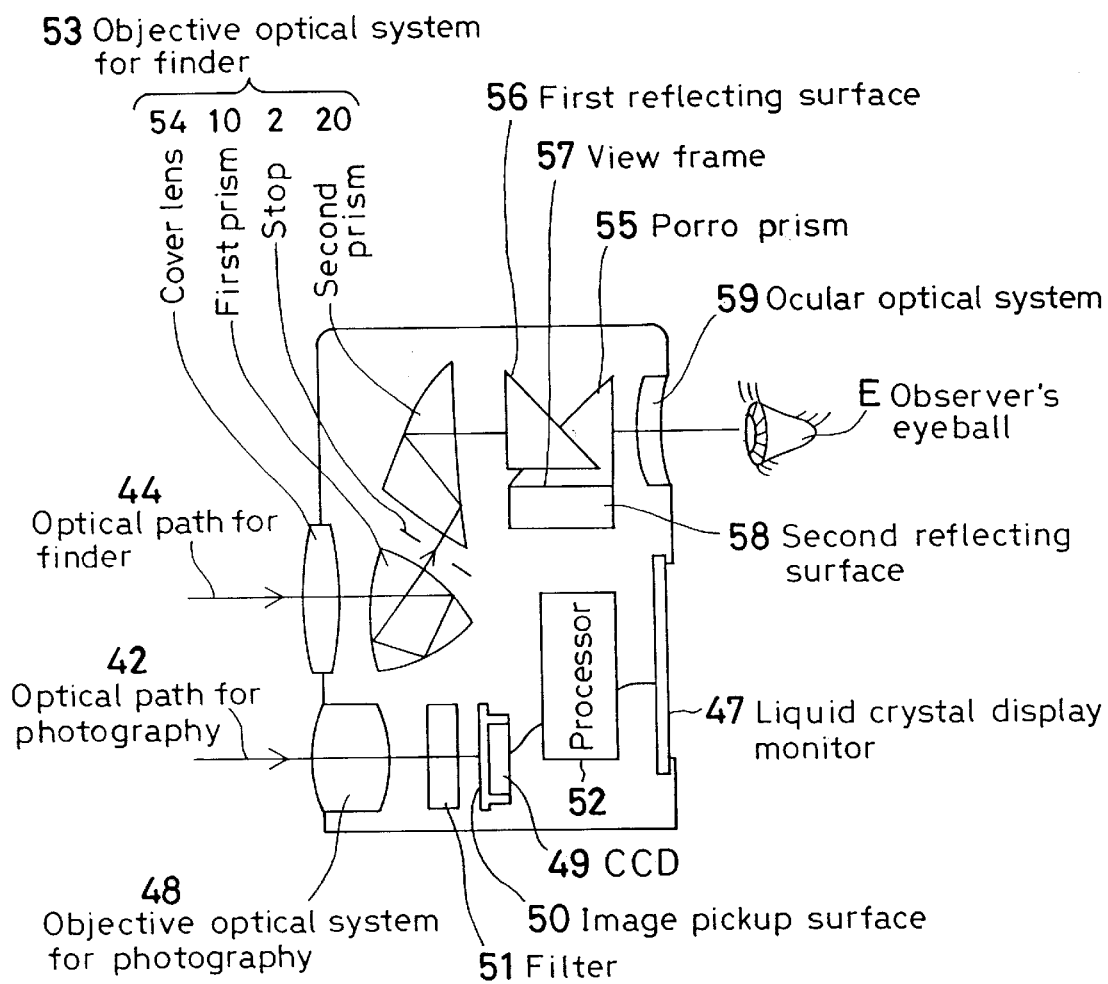
FIG. 14 is a sectional view showing the arrangement of the electronic camera in FIG. 12.

FIGS. 12 to 14 are conceptual views showing an arrangement in which the image-forming optical system according to the present invention is incorporated into an objective optical system of a finder unit of an electronic camera. FIG. 12 is a perspective view showing the external appearance of an electronic camera 40 as viewed from the front side thereof. FIG. 13 is a perspective view of the electronic camera 40 as viewed from the rear side thereof. FIG. 14 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera may be arranged in the form of a silver halide camera in which a silver halide film is disposed in place of the CCD 49.

Furthermore, an image-forming optical system similar to Example 1, for example, is placed in the optical path 44 for the finder as an objective optical system 53 for the finder. In this case, a cover lens 54 having a positive power is provided as a cover member to form a part of the objective optical system 53, thereby enlarging the field angle. It should be noted that the cover lens 54 and the prism 10 of the image-forming optical system, which is closer to the object side than the stop 2, constitute a front unit of the objective optical system 53 for the finder. The prism 20 of the image-forming optical system, which is closer to the image side than the stop 2, constitutes a rear unit of the objective optical system 53 for the finder. An object image produced by the objective optical system 53 for the finder is formed on a view frame 57 of a Porro prism 55, which is an image-erecting member. It should be noted that the view frame 57 is placed between a first reflecting surface 56 and second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Figure 15:
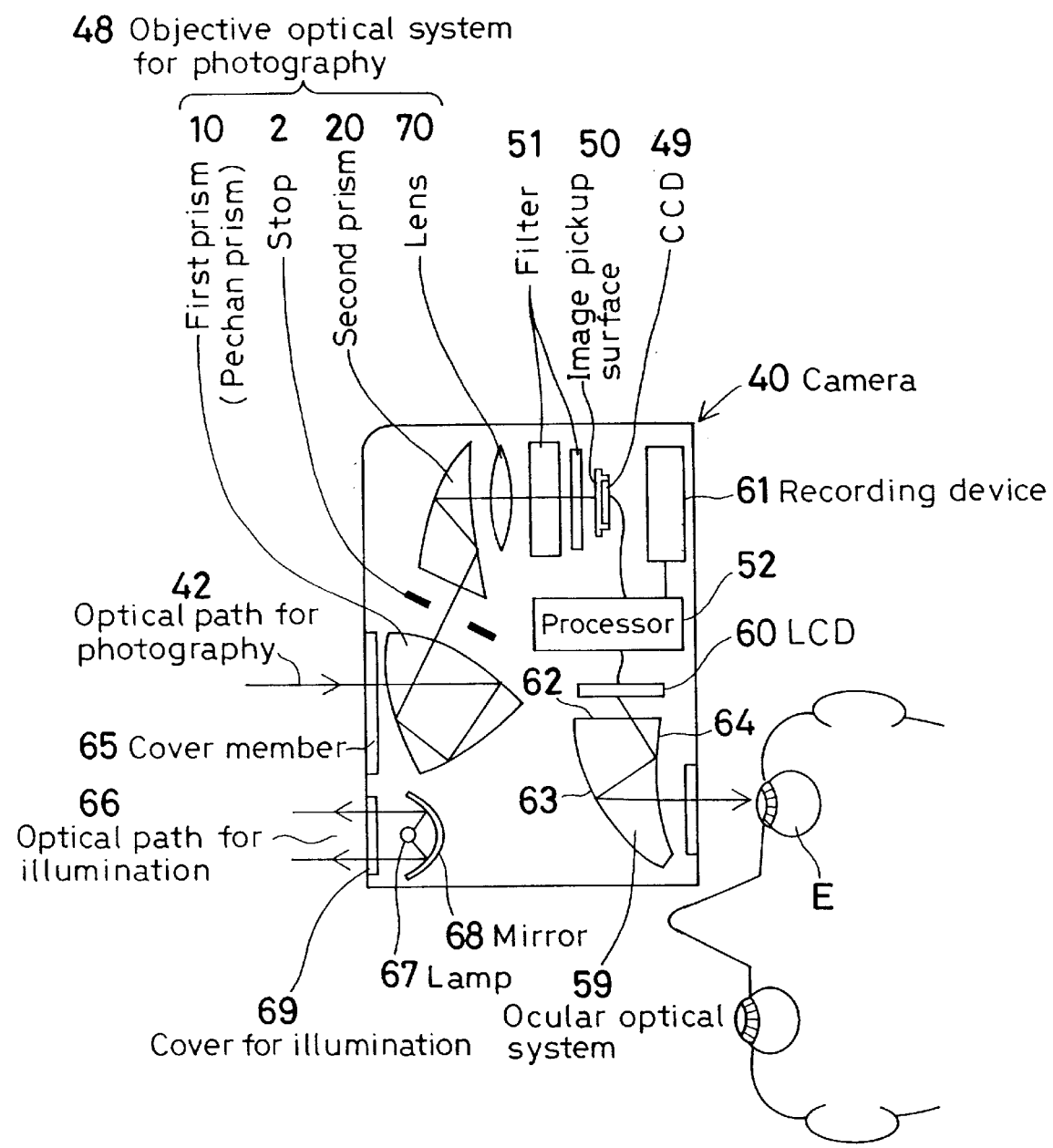
FIG. 15 is a conceptual view of another electronic camera to which an image-forming optical system according to the present invention is applied.

FIG. 15 is a conceptual view showing an arrangement in which the image-forming optical system according to the present invention is incorporated into an objective optical system 48 of a photography part of an electronic camera 40. In this example, an optical path 66 for illumination is placed in parallel to an optical path 42 for photography. Illuminating light from a lamp 67 is formed into an approximately parallel beam of light by a mirror 68 to illuminate a subject through a cover 69 for illumination. The objective optical system 48 for photography, which is placed in the optical path 42 for photography, is formed by using an image-forming optical system similar to Example 1. An object image produced by the objective optical system 48 for photography is formed on an image pickup surface 50 of a CCD 49 through a filter 51 including a low-pass filter, an infrared cutoff filter, etc. In this example, the objective optical system 48 for photography includes a positive lens 70 placed in a part of the image-forming optical system. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism having a configuration similar to that used in the image-forming optical system according to the present invention. In this example, the ocular optical system 59 has three surfaces, i.e. an entrance surface 62, a reflecting surface 63, and a surface 64 serving as both reflecting and refracting surfaces. At least one of the two surfaces 63 and 64 having a reflecting action, preferably each of them, is formed from a plane-symmetry free-form surface with only one plane of symmetry that gives a power to a light beam and corrects aberrations due to decentration. The only one plane of symmetry is formed in approximately the same plane as the only one plane of symmetry of the plane-symmetry free-form surfaces in the prisms 10 and 20 of the objective optical system 48 for photography. The objective optical system 48 for photography may include another lens (positive or negative lens) as a constituent element thereof. In this example, a positive lens 70 is placed on the image side of the second prism 20.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

It should be noted that in the image-forming optical system according to the present invention, the surface closest to the object side may be used as a cover member instead of providing a cover member separately. In this example, however, the surface that is closest to the object side is the entrance surface of the prism 10. Because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 16:
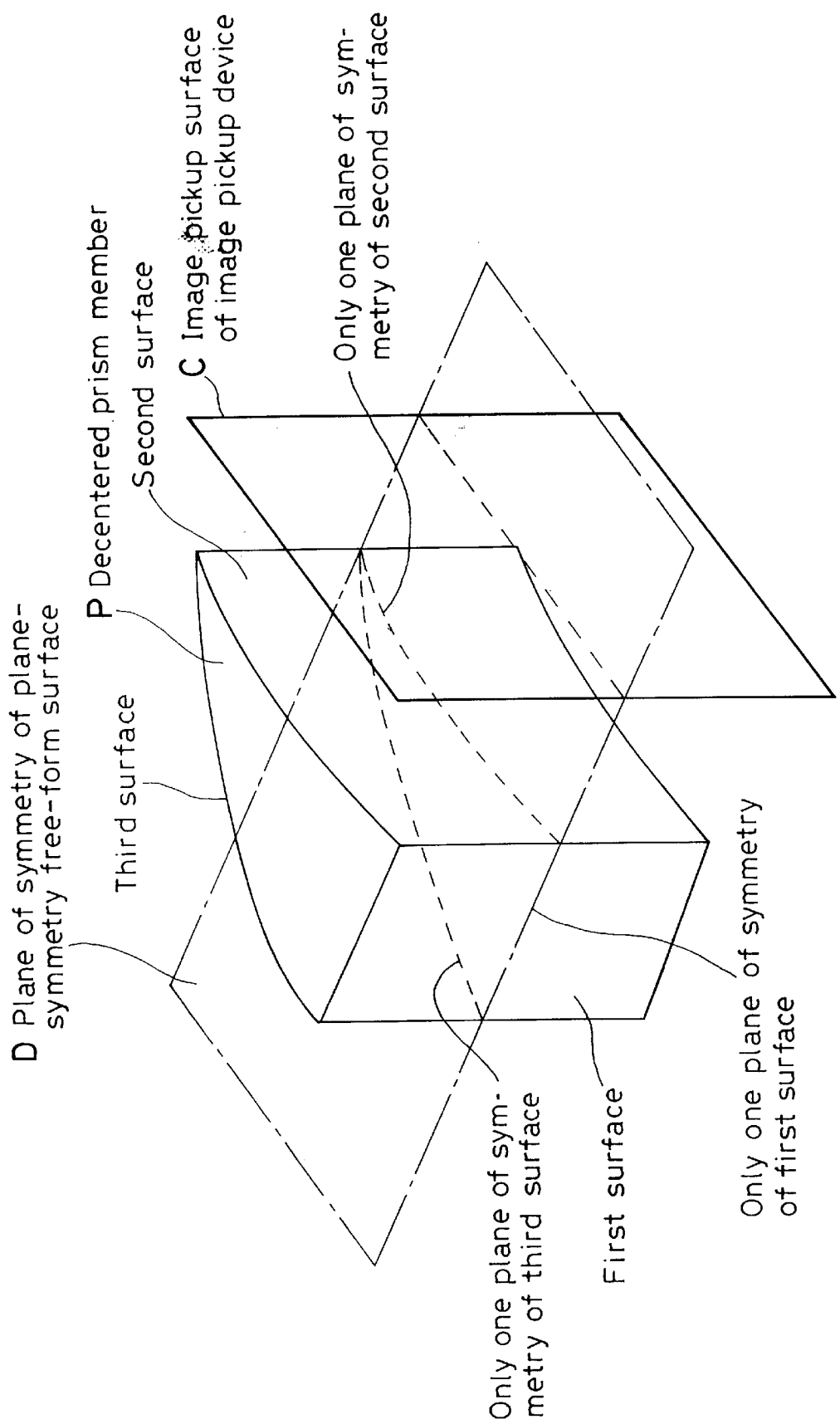
FIG. 16 is a diagram showing a desirable arrangement for the image-forming optical system according to the present invention when it is placed in front of an image pickup device.
Figure 17:
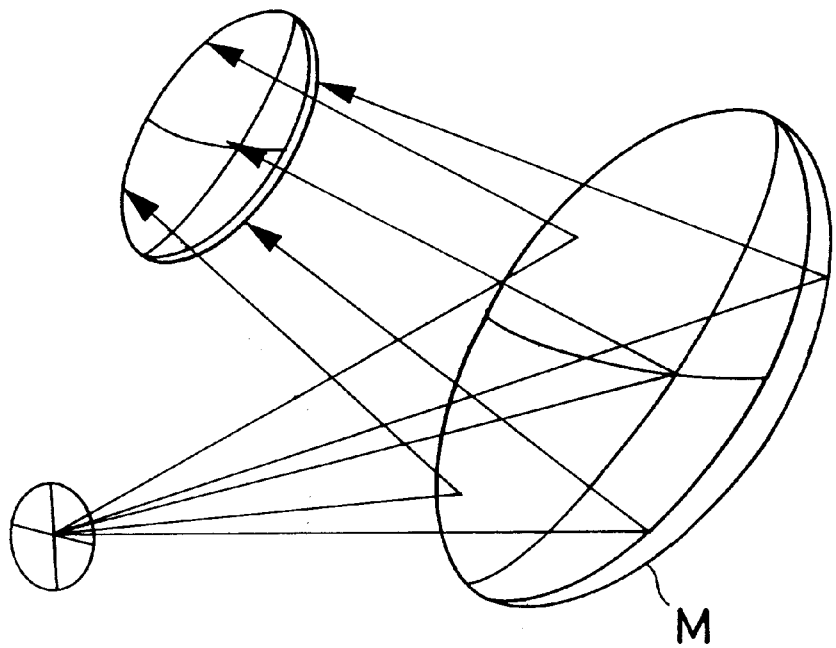
FIG. 17 is a conceptual view for describing curvature of field produced by a decentered reflecting surface.
Figure 18:
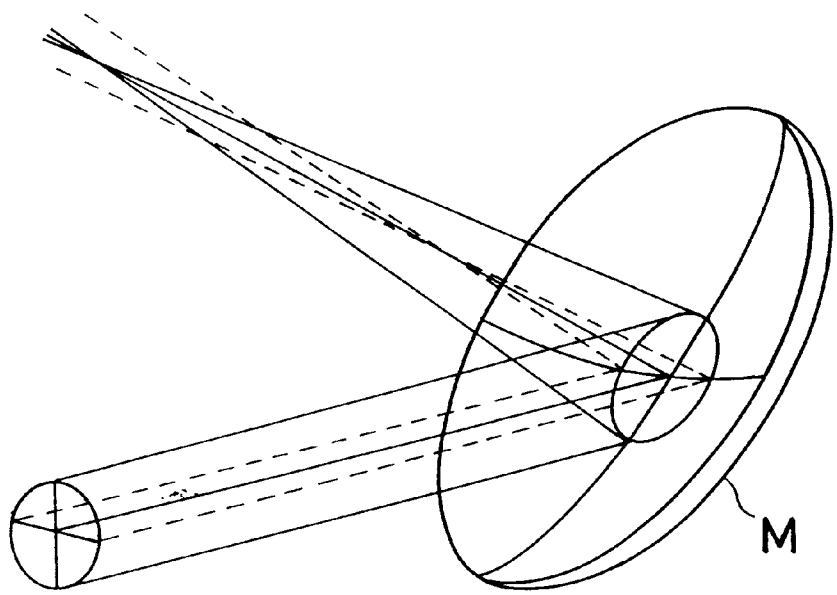
FIG. 18 is a conceptual view for describing astigmatism produced by a decentered reflecting surface.
Figure 19:
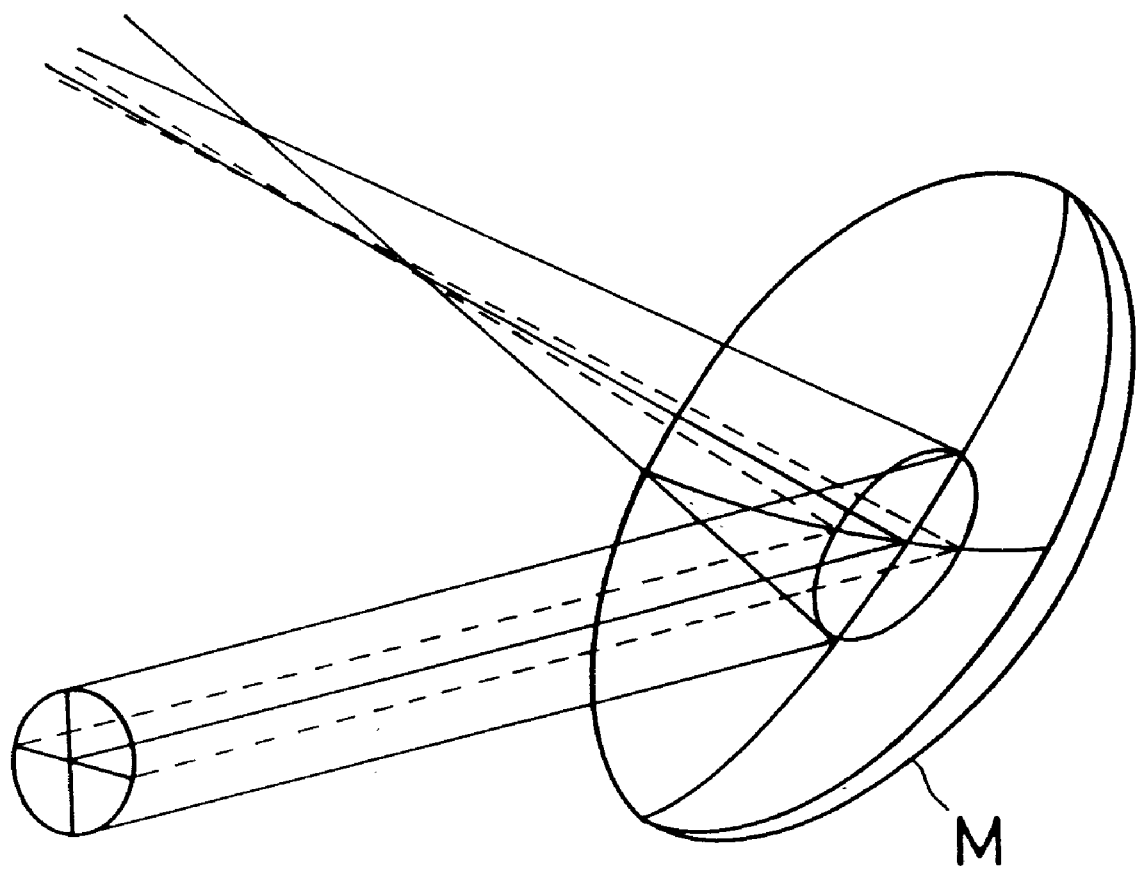
FIG. 19 is a conceptual view for describing coma produced by a decentered reflecting surface.

FIG. 16 is a diagram showing a desirable arrangement for the image-forming optical system according to the present invention when the image-forming optical system is placed in front of an image pickup device, e.g. a CCD, or a filter. In the figure, a decentered prism P is a prism included in the image-forming optical system according to the present invention. When the image pickup surface C of an image pickup device forms a quadrangle as shown in the figure, it is desirable from the viewpoint of forming a beautiful image to place the decentered prism P so that the plane D of symmetry of a plane-symmetry free-form surface provided in the decentered prism P is parallel to at least one of the sides forming the quadrangular image pickup surface C.

When the image pickup surface C has a shape in which each of the four interior angles is approximately 90 degrees, such as a square or a rectangle, it is desirable that the plane D of symmetry of the plane-symmetry free-form surface should be parallel to two sides of the image pickup surface C that are parallel to each other. It is more desirable that the plane D of symmetry should lie at the middle between two parallel sides and coincide with a position where the image pickup surface C is in a symmetry between the right and left halves or between the upper and lower halves. The described arrangement enables the required assembly accuracy to be readily obtained when the image-forming optical system is incorporated into an apparatus. This is useful for mass-production.

When a plurality or all of the optical surfaces constituting the decentered prism P, i.e. the first surface, the second surface, the third surface, etc. are plane-symmetry free-form surfaces, it is desirable from the viewpoint of design and aberration correcting performance to arrange the decentered prism P so that the planes of symmetry of the plurality or all of the optical surfaces are in the same plane D. In addition, it is desirable that the plane D of symmetry and the image pickup surface C should be in the above-described relationship.

As has been described above, and as will be clear from the examples, the present invention makes it possible to obtain a high-performance image-forming optical system that is particularly suitable for a camera and made compact and thin by using a reduced number of constituent optical elements and folding an optical path using reflecting surfaces arranged to minimize the number of reflections.

What we claim is:

1. An image-forming optical system for forming an image of an object, said image-forming optical system comprising a first prism and a second prism, said first prism being placed on an object side of said second prism, said first prism having, in order in which rays from the object pass, a first transmitting surface, a first reflecting surface, a second reflecting surface, a third reflecting surface, and a second transmitting surface, wherein said first transmitting surface and said third reflecting surface are an identical surface, and said first reflecting surface and said second transmitting surface are an identical surface, said second prism having an entrance surface, at least one reflecting surface, and an exit surface, wherein said first prism and said second prism each have at least one reflecting surface with a rotationally asymmetric surface configuration that corrects decentration aberrations.

2. An image-forming optical system according to claim 1, wherein when an optical axis is defined by an axial principal ray emanating from a center of the object and passing through a center of a stop to reach a center of an image plane, said first prism has a configuration in which an angle formed between the optical axis incident on said third reflecting surface and the optical axis reflected by said third reflecting surface is larger than an angle formed between the optical axis incident on said second reflecting surface and the optical axis reflected by said second reflecting surface, and the angle formed between the optical axis incident on said first reflecting surface and the optical axis reflected by said first reflecting surface is larger than an angle formed between the optical axis incident on said second reflecting surface and the optical axis reflected by said second reflecting surface.

3. An image-forming optical system according to claim 1 or 2, wherein a stop is placed between said first prism and said second prism, and said image-forming optical system is approximately telecentric on an image side thereof.

4. An image-forming optical system according to claim 1 or 2, wherein said first prism has a diverging action, and said second prism has a converging action.

5. An image-forming optical system according to claim 1 or 2, wherein said first reflecting surface and said third reflecting surface are totally reflecting surfaces, respectively.

6. An image-forming optical system according to claim 1 or 2, wherein said second prism has, in order in which rays from the object pass, a first transmitting surface, a first reflecting surface, a second reflecting surface, and a second transmitting surface, wherein said first reflecting surface and said second transmitting surface are an identical surface.

7. An image-forming optical system according to claim 1 or 2, wherein said rotationally asymmetric surface is a free-form surface having only one plane of symmetry.

8. An image-forming optical system according to claim 7, wherein the only one plane of symmetry of at least one free-form surface in said first prism and the only one plane of symmetry of at least one free-form surface in said second prism are in approximately a same plane.

9. A photographic apparatus comprising:
the image-forming optical system of claim 8; and
an image pickup device placed in an image plane formed by said image-forming optical system to convert a received image signal into an electric signal;
wherein said image pickup device has an image pickup surface that forms a polygon consisting of at least 4 sides, and said only one plane of symmetry is approximately parallel to two mutually opposing sides of the polygon.

10. A photographic apparatus according to claim 9, wherein said only one plane of symmetry lies coincident with a position where the image pickup surface of said image pickup device is in a symmetry between upper and lower halves thereof or between right and left halves thereof.

11. A photographic apparatus according to claim 9, wherein when an optical axis is defined by an axial principal ray emanating from a center of an object and passing through a center of a stop to reach a center of the image plane, an optical path of the optical axis in the first prism from the object side and an optical path of the optical axis in the second prism from the object side are formed in said only one plane of symmetry.

12. An image-forming optical system according to claim 1 or 2, wherein when an optical axis is defined by an axial principal ray emanating from a center of the object and passing through a center of a stop to reach a center of an image plane, the optical axis entering the first transmitting surface of said first prism and the optical axis exiting from the exit surface of said second prism are approximately parallel to each other.

13. An image-forming optical system for forming an image of an object,
said image-forming optical system comprising a first prism and a second prism,
said first prism being placed on an object side of said second prism,
said first prism having an entrance surface, at least one reflecting surface, and an exit surface,
said second prism having, in order in which rays from the object pass, a first transmitting surface, a first reflecting surface, a second reflecting surface, a third reflecting surface, and a second transmitting surface,
wherein said first transmitting surface and said third reflecting surface are an identical surface, and said first reflecting surface and said second transmitting surface are an identical surface,
wherein said first prism and said second prism each have at least one reflecting surface with a rotationally asymmetric surface configuration that corrects decentration aberrations.

14. An image-forming optical system according to claim 1, 2 or 13, which forms an object image on an image plane without forming an intermediate image in an optical path.

15. An image-forming optical system comprising at least two prisms arranged to form an image of an object on an image plane without forming an intermediate image in an optical path,
wherein the following condition is satisfied:

$$0.3 < d/\text{Ih} < 10 \tag{1}$$

where, when a light ray emanating from a center of the object and passing through a center of a stop to reach a center of the image plane is defined as an axial principal ray, and a direction in which the axial principal ray enters the optical system is defined as a Z-axis direction, d is a maximum thickness in the Z-axis direction of an area that is defined by effective surface areas of all optical surfaces constituting the optical system and those of a stop plane and the image plane, and Ih is a maximum image height in the optical system.

16. An image-forming optical system according to claim 15, wherein the following condition is satisfied:

$$0.3 < d/\text{Ih} < 5. \tag{2}$$

17. An image-forming optical system according to claim 15 or 16, wherein the following condition is satisfied:

$$0.1 < d_1/\text{Ih} < 20 \tag{3}$$

where $d_1$ is a length of the axial principal ray between the two prisms.

18. An image-forming optical system according to claim 15 or 16, wherein at least one of said at least two prisms satisfies the following condition:

$$30° < \theta_1 < 150° \tag{5}$$

where $\theta_1$ is an angle formed between the axial principal ray entering the prism (entrance axis) and the axial principal ray exiting from the prism (exit axis).

19. An image-forming optical system according to claim 15 or 16, wherein at least one reflecting surface of said at least two prisms satisfies the following condition:

$$25° < \theta_2 < 80° \tag{8}$$

where $\theta_2$ is a reflection angle of the axial principal ray at the reflecting surface with respect to a line normal to the reflecting surface.

20. An image-forming optical system according to claim 15 or 16, wherein all refracting surfaces of said at least two prisms satisfy the following condition:

$$|\text{Ih}/R| < 0.5 \tag{10}$$

where R is a radius of curvature of each refracting surface in a vicinity of the axial principal ray; in a case where a refracting surface has a free-form surface configuration expressed by $Z = \Sigma C_j X^m Y^n$, R is $R = 1/(2C_4)$ or $R = 1/(2C_6)$ defined by a coefficient $C_4$ of $X^2$ or a coefficient $C_6$ of $Y^2$.

21. An image-forming optical system according to claim 15 or 16, wherein at least one refracting surface of said at least two prisms satisfies the following condition:

$$3° < \phi < 60° \tag{12}$$

where $\phi$ is a tilt of the refracting surface with respect to the axial principal ray.

22. A photographic apparatus wherein an image-forming optical system according to claim 1, 2, 13, 15 or 16 is disposed as an objective optical system for photography.

23. A photographic apparatus according to claim 22, wherein an image pickup device is disposed in an image plane of said objective optical system for photography to convert a received image signal into an electrical signal, and an image display device is provided to form an image for observation from said electrical signal.

24. A photographic apparatus wherein the image-forming optical system according to claim 1, 2, 13, 15 or 16 is included in an objective optical system of a viewing optical system that is provided separately from a photographic optical system.

* * * * *